（12）United States Patent
Noh et al.

(10) Patent No.: US 9,154,343 B2
(45) Date of Patent: Oct. 6, 2015

(54) UPLINK SIGNAL TRANSMISSION AND RECEPTION USING OPTIMIZED RANK 3 CODEBOOK

(71) Applicant: LG ELECTRONICS INC., Seoul (KR)

(72) Inventors: Yu Jin Noh, Anyang-si (KR); Dong Wook Roh, Anyang-si (KR); Byeong Woo Kang, Anyang-si (KR); Bong Hoe Kim, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/645,834

(22) Filed: Mar. 12, 2015

(65) Prior Publication Data

US 2015/0188735 A1    Jul. 2, 2015

Related U.S. Application Data

(63) Continuation of application No. 13/254,161, filed as application No. PCT/KR2010/002261 on Apr. 13, 2010, now Pat. No. 9,007,885.

(60) Provisional application No. 61/168,931, filed on Apr. (Continued)

(30) Foreign Application Priority Data

Apr. 6, 2010    (KR) .................. 10-2010-0031369

(51) Int. Cl.
*H04J 11/00*    (2006.01)
*H04B 7/208*    (2006.01)
(Continued)

(52) U.S. Cl.
CPC ........ *H04L 25/03923* (2013.01); *H04B 7/0456* (2013.01); *H04W 72/06* (2013.01)

(58) Field of Classification Search
CPC .. H04B 7/0639; H04B 7/0634; H04B 7/0452; H04B 7/0456; H04B 7/0478; H04L 25/0242; H04W 72/0413
USPC .................. 370/210, 328, 329, 344, 480, 481
See application file for complete search history.

(56) References Cited

U.S. PATENT DOCUMENTS 7,970,074 B2    6/2011 Ihm et al.
8,259,835 B2    9/2012 Kim
(Continued)

FOREIGN PATENT DOCUMENTS

EP    1973284    9/2008
EP    2159950    3/2010
(Continued)

OTHER PUBLICATIONS

Chester Sungchung Park et al: "Evolution of Uplink MIMO for LTE-Advanced", IEEE Communications Magazine, vol. 49, No. 2, Feb. 2011, pp. 112-121, XP011334685.
(Continued)

*Primary Examiner* — Hoang-Chuong Vu
(74) *Attorney, Agent, or Firm* — Lee, Hong, Degerman, Kang & Waimey

(57) ABSTRACT

A method for transmitting and receiving uplink signals using an optimized rank 3 codebook is disclosed. The optimized rank 3 codebook includes 6 precoding matrix groups, each of which has 1 variable having an amplitude of 1. Preferably, the optimized 4Tx rank 3 codebook has 12 precoding matrix, two precoding matrixes are selected from each the above 6 precoding matrix groups considering chordal distance and the number of precoding matrix.

8 Claims, 12 Drawing Sheets

Related U.S. Application Data 13, 2009, provisional application No. 61/181,666, filed on May 28, 2009, provisional application No. 61/183,065, filed on Jun. 1, 2009, provisional application No. 61/184,313, filed on Jun. 5, 2009, provisional application No. 61/184,830, filed on Jun. 7, 2009, provisional application No. 61/185,198, filed on Jun. 9, 2009, provisional application No. 61/186,386, filed on Jun. 12, 2009, provisional application No. 61/219,396, filed on Jun. 23, 2009.

(51) Int. Cl.
*H04L 25/03* (2006.01)
*H04B 7/04* (2006.01)
*H04W 72/06* (2009.01)

(56) References Cited

U.S. PATENT DOCUMENTS

| | | | |
|---|---|---|---|
| 8,391,392 B2 | 3/2013 | Melzer et al. | |
| 8,451,932 B2 | 5/2013 | Onggosanusi et al. | |
| 8,483,085 B2 | 7/2013 | Pan et al. | |
| 8,520,494 B2 * | 8/2013 | Yang et al. | 370/204 |
| 8,711,970 B2 | 4/2014 | Melzer et al. | |
| 2005/0041750 A1 | 2/2005 | Lau | |
| 2008/0292013 A1 | 11/2008 | Varadarajan et al. | |
| 2010/0232384 A1 * | 9/2010 | Farajidana et al. | 370/329 |
| 2011/0128942 A1 * | 6/2011 | Kim et al. | 370/336 |
| 2012/0170516 A1 | 7/2012 | Noh et al. | |

FOREIGN PATENT DOCUMENTS

| | | |
|---|---|---|
| JP | 2012517761 | 8/2012 |
| JP | 2012519453 | 8/2012 |
| KR | 20070080402 | 8/2007 |
| KR | 1020070080402 | 8/2007 |
| RU | 2005115849 | 10/2005 |
| WO | 03/084097 | 10/2003 |
| WO | 2007/106980 | 9/2007 |
| WO | 2007111718 | 10/2007 |
| WO | 2008114956 | 9/2008 |
| WO | 2009023860 | 2/2009 |

OTHER PUBLICATIONS

Russian Agency for Patent and Trademarks Application Serial No. 2011146008/07, Notice on Grant dated Sep. 25, 2012, 10 pages.
Ericsson, "Uplink SU-MIMO in LTE-Advanced", R1-090377, 3GPP TSG-RAN WG1 #55bis, Jan. 2009, 10 pages.
Texas Instruments, "Codebook Design for 4Tx Uplink SU-MIMO", R1-091301, 3GPP TSG RAN WG1 56bis, Mar. 2009, 12 pages.
LG Electronics, "Uplink Codebook for 4Tx SU-MIMO", R1-092507, 3GPP TSG RAN WG1#57bis, Jun. 2009, 9 pages.
Texas Instruments, "4Tx Codebook for UL SU-MIMO: Rank-3", R1-092949, 3GPP TSG RAN WG1 57bis, Jun. 2009, 7 pages.
Qualcomm Europe, "Precoding Design for LTE-A Uplink MIMO Operation", R1-091465, 3GPP TSG-RAN WG1 #56bis, Mar. 2009, 15 pages.
Inoue, et al., "Performance Evaluation of Clustered DFT-S-OFDM and N x DFT-S-OFDM", Institute of Electronics, Information and Communication Engineers, Mar. 2009, 2 pages.
Philips, "CSI feedback improvements for LTE-A based on multiple codebooks", Tdoc R1-091288, 3GPP TSG RAN WG1 Meeting #56bis, Mar. 2009, 8 pages.
LG Electronics, "Consideration on non channel-dependant spatial multiplexing for PUSCH", 3GPP TSG RAN WG1 Meeting #56, R1-090783, Feb. 2009, 5 pages.
LG Electronics, "Precoding design for Uplink SU-MIMO", 3GPP TSG RAN WG1#56bis, R1-091220, Mar. 2009, 4 pages.
State Intellectual Property Office of the People's Republic of China Application Serial No. 201080013166.7, Office Action dated Aug. 29, 2013, 8 pages.

* cited by examiner

→ Pair of groups with Min chordal distance 1

--→ Pair of groups with Min chordal distance $\frac{\sqrt{3}}{2}$

Phase difference = 180 deg

Phase difference = 90 deg

Phase difference = 0 deg

UPLINK SIGNAL TRANSMISSION AND RECEPTION USING OPTIMIZED RANK 3 CODEBOOK

CROSS-REFERENCE TO RELATED APPLICATIONS

This application is a continuation of U.S. application Ser. No. 13/254,161, filed on Aug. 31, 2011, now U.S. Pat. No. 9,007,885, which is the National Stage filing under 35 U.S.C. 371 of International Application No. PCT/KR2010/002261, filed on Apr. 13, 2010, which claims the benefit of earlier filing date and right of priority to Korean Application No. 10-2010-0031369, filed on Apr. 6, 2010, and also claims the benefit of U.S. Provisional Application Nos. 61/219,396, filed on Jun. 23, 2009, 61/186,386, filed on Jun. 12, 2009, 61/185,198, filed on Jun. 9, 2009, 61/184,830, filed on Jun. 7, 2009, 61/184,313, filed on Jun. 5, 2009, 61/183,065, filed on Jun. 1, 2009, 61/181,666, filed on May 28, 2009, and 61/168,931, filed on Apr. 13, 2009, the contents of which are all hereby incorporated by reference herein in their entirety.

BACKGROUND OF THE INVENTION

1. Field of the Invention

The present invention relates to a wireless mobile communication system, and more particularly to a communication system based on a Multiple Input Multiple Output (MIMO) scheme.

2. Discussion of the Related Art

MIMO technology is an abbreviation for Multiple Input Multiple Output technology. MIMO technology uses a plurality of transmission (Tx) antennas and a plurality of reception (Rx) antennas to improve the efficiency of transmission and reception (Tx/Rx) of data. In other words, MIMO technology allows a transmission end or reception end of a wireless communication system to use multiple antennas (hereinafter referred to as a multi-antenna), so that the capacity or performance can be improved. For convenience of description, the term "MIMO" can also be considered to be a multi-antenna technology.

In more detail, MIMO technology is not dependent on a single antenna path to receive a message. Instead, the MIMO technology collects a plurality of data fragments received via several antennas, merges the collected data fragments, and completes total data. As a result, MIMO technology can increase a data transmission rate within a predetermined-sized cell region, or can increase system coverage while guaranteeing a specific data transmission rate. Under this situation, MIMO technology can be widely applied to mobile communication terminals, repeaters, or the like. MIMO technology can extend the range of data communication, so that it can overcome the limited amount of transmission data of mobile communication systems.

FIG. 1 is a block diagram illustrating a general MIMO communication system.

Referring to FIG. 1, the number of transmission (Tx) antennas in a transmitter is $N_T$, and the number of reception (Rx) antennas in a receiver is $N_R$. In this way, theoretical channel transmission capacity of the MIMO communication system when both the transmitter and the receiver use a plurality of antennas is greater than that of another case in which only the transmitter or the receiver uses several antennas. The theoretical channel transmission capacity of the MIMO communication system increases in proportion to the number of antennas. Therefore, data transmission rate and frequency efficiency are greatly increased. Provided that a maximum data transmission rate acquired when a single antenna is used is set to $R_o$, a data transmission rate acquired when multiple antennas are used can theoretically increase by a predetermined amount that corresponds to the single antenna data transmission rate ($R_o$) multiplied by a rate of increase $R_i$. The rate of increase ($R_i$) can be represented by the following equation 1.

$$R_i = \min(N_T, N_R) \qquad \text{[Equation 1]}$$

For example, provided that a MIMO system uses four transmission (Tx) antennas and four reception (Rx) antennas, the MIMO system can theoretically acquire a high data transmission rate which is four times higher than that of a single antenna system. After the above-mentioned theoretical capacity increase of the MIMO system was demonstrated in the mid-1990s, many developers began to conduct intensive research into a variety of technologies which can substantially increase a data transmission rate using the theoretical capacity increase. Some of the above technologies have been reflected in a variety of wireless communication standards, for example, a third-generation mobile communication or a next-generation wireless LAN, etc. The above-mentioned MIMO technology can be classified into a spatial diversity scheme (also called a Transmit Diversity scheme) and a spatial multiplexing scheme. The spatial diversity scheme increases transmission reliability using symbols passing various channel paths. The spatial multiplexing scheme simultaneously transmits a plurality of data symbols via a plurality of transmission (Tx) antennas, so that it increases a transmission rate of data. In addition, the combination of the spatial diversity scheme and the spatial multiplexing scheme has also been recently developed to properly acquire unique advantages of the two schemes.

In association with the MIMO technology, a variety of MIMO-associated technologies have been intensively researched by many companies or developers, for example, research into an information theory associated with a MIMO communication capacity calculation under various channel environments or multiple access environments, research into radio frequency (RF) channel measurement and modeling of the MIMO system, and research into a space-time signal processing technology for increasing transmission reliability and data transmission rate.

In a $3^{rd}$ Generation Partnership Project Long Term Evolution (3GPP LTE) system, the above-mentioned MIMO scheme is applied to only downlink signal transmission of the 3GPP LTE system. The MIMO technology may also be extended to uplink signal transmission. In this case, a transmitter structure should be changed to implement the MIMO technology, so that a Peak power to Average Power Ratio (PAPR) or Cubic Metric (CM) characteristics may be deteriorated. Therefore, there is needed a new technology capable of effectively applying the MIMO scheme to uplink signal transmission.

Specifically, an appropriate number of precoding matrices are selected from a codebook for use in uplink rank 3 transmission, and at the same time it is necessary for the codebook to maximize a chordal distance between precoding matrices.

SUMMARY OF THE INVENTION

Accordingly, the present invention is directed to an uplink signal transmission and method using an optimized rank 3 codebook that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a user equipment (UE) to transmit uplink signals via four antennas includes mapping the uplink signals to three layers; performing Discrete Fourier Transform (DFT) spreading upon each of signals of the three layers, precoding the three DFT-spread layer signals using a specific precoding matrix selected from among a prestored codebook, performing a predetermined process for constructing a Single Carrier-Frequency Division Multiple Access (SC-FDMA) symbol upon the precoded signals, and transmitting the SC-FDMA symbol to a Node B, i.e. Node B via the four antennas, wherein the prestored codebook consists of 6 precoding matrix groups $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

$$\text{and} \begin{bmatrix} 0 & 1 & 0 \\ 0 & 0 & 1 \\ 1 & 0 & 0 \\ X & 0 & 0 \end{bmatrix}$$

(where X is a complex variable having an amplitude of 1)). To each of the precoding matrixes in the codebook a predetermined constant can be multiplied. However, this constant is not discussed in this document for convenience. The prestored codebook may include two precoding matrices selected from each of the 6 precoding matrix groups. The prestored codebook may include two precoding matrices selected from each of the 6 precoding matrix groups, wherein X values in each of the 6 precoding matrix groups have a phase difference of 180° in a complex plane. The prestored codebook may include one precoding matrix having the X value of 1 in each of the 6 precoding matrix groups and the other precoding matrix having the X value of −1 in each of the 6 precoding matrix groups.

The prestored codebook may include the following 12 precoding matrices of $$\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}, \begin{bmatrix} 1 & 0 & 0 \\ 0 & 1 & 0 \\ 1 & 0 & 0 \\ 0 & 0 & 1 \end{bmatrix}, \begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ 0 & 0 & 1 \\ 1 & 0 & 0 \end{bmatrix},$$

$$\begin{bmatrix} 1 & 0 & 0 \\ 0 & 1 & 0 \\ 0 & 0 & 1 \\ -1 & 0 & 0 \end{bmatrix}, \begin{bmatrix} 0 & 1 & 0 \\ 1 & 0 & 0 \\ 1 & 0 & 0 \\ 0 & 0 & 1 \end{bmatrix}, \begin{bmatrix} 0 & 1 & 0 \\ 1 & 0 & 0 \\ -1 & 0 & 0 \\ 0 & 0 & 1 \end{bmatrix}, \begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix},$$

$$\begin{bmatrix} 0 & 1 & 0 \\ 0 & 0 & 1 \\ 1 & 0 & 0 \\ 1 & 0 & 0 \end{bmatrix}, \begin{bmatrix} 0 & 1 & 0 \\ 0 & 0 & 1 \\ 1 & 0 & 0 \\ -1 & 0 & 0 \end{bmatrix}.$$

In another aspect of the present invention, a user equipment (UE) for transmitting uplink signals via multiple antennas includes four antennas for transmitting and receiving signals, a memory for storing a codebook used for transmitting three layer signals via the four antennas, and a processor connected to the multiple antennas and the memory so as to process transmission of the uplink signals, wherein the processor includes a layer mapper for mapping the uplink signals to the three layers, a Discrete Fourier Transform (DFT) module for performing DFT spreading upon each of the three layer signals, a precoder for precoding the three DFT-spread layer signals received from the DFT module using a specific precoding matrix selected from among the codebook stored in the memory, and a transmission module for performing a predetermined process for constructing a Single Carrier-Frequency Division Multiple Access (SC-FDMA) symbol upon the precoded signals, and transmitting the processed signals to a Node BNode B via the four antennas, wherein the prestored codebook consists of 6 precoding matrix groups of $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

$$\text{and} \begin{bmatrix} 0 & 1 & 0 \\ 0 & 0 & 1 \\ 1 & 0 & 0 \\ X & 0 & 0 \end{bmatrix}$$

(where X is a complex variable having an amplitude of 1).

The memory may store, as the codebook, two precoding matrices from each of the 6 precoding matrix groups. The memory may store, as the codebook, two precoding matrices in which X values in each of the 6 precoding matrix groups have a phase difference of 180° in a complex plane. The memory may store, as the codebook, both one precoding matrix having the X value of 1 in each of the 6 precoding matrix groups and the other precoding matrix having the X value of −1 in each of the 6 precoding matrix groups.

The memory may store, as the codebook, 12 precoding matrices of $$\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}, \begin{bmatrix} 1 & 0 & 0 \\ 0 & 1 & 0 \\ 1 & 0 & 0 \\ 0 & 0 & 1 \end{bmatrix}, \begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ 0 & 0 & 1 \\ 1 & 0 & 0 \end{bmatrix},$$

$$\begin{bmatrix} 1 & 0 & 0 \\ 0 & 1 & 0 \\ 0 & 0 & 1 \\ -1 & 0 & 0 \end{bmatrix}, \begin{bmatrix} 0 & 1 & 0 \\ 1 & 0 & 0 \\ 1 & 0 & 0 \\ 0 & 0 & 1 \end{bmatrix}, \begin{bmatrix} 0 & 1 & 0 \\ 1 & 0 & 0 \\ -1 & 0 & 0 \\ 0 & 0 & 1 \end{bmatrix}, \begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix},$$

$$\begin{bmatrix} 0 & 1 & 0 \\ 0 & 0 & 1 \\ 1 & 0 & 0 \\ 1 & 0 & 0 \end{bmatrix}, \begin{bmatrix} 0 & 1 & 0 \\ 0 & 0 & 1 \\ 1 & 0 & 0 \\ -1 & 0 & 0 \end{bmatrix}.$$

In another aspect of the present invention, a method for controlling a Node BNode B to receive uplink signals of a user equipment (UE) includes receiving signals having been transmitted via four antennas and three layers from the user equipment (UE), and processing the received signals using a specific precoding matrix selected from among a prestored codebook, wherein the prestored codebook consists of 6 precoding matrix groups of $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

and $\begin{bmatrix} 0 & 1 & 0 \\ 0 & 0 & 1 \\ 1 & 0 & 0 \\ X & 0 & 0 \end{bmatrix}$ (where X is a complex variable having an amplitude of 1).

The prestored codebook may consists of 12 precoding matrices of $$\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}, \begin{bmatrix} 1 & 0 & 0 \\ 0 & 1 & 0 \\ 1 & 0 & 0 \\ 0 & 0 & 1 \end{bmatrix}, \begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ 0 & 0 & 1 \\ 1 & 0 & 0 \end{bmatrix},$$

$$\begin{bmatrix} 1 & 0 & 0 \\ 0 & 1 & 0 \\ 0 & 0 & 1 \\ -1 & 0 & 0 \end{bmatrix}, \begin{bmatrix} 0 & 1 & 0 \\ 1 & 0 & 0 \\ 1 & 0 & 0 \\ 0 & 0 & 1 \end{bmatrix}, \begin{bmatrix} 0 & 1 & 0 \\ 1 & 0 & 0 \\ -1 & 0 & 0 \\ 0 & 0 & 1 \end{bmatrix}, \begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix},$$

$$\begin{bmatrix} 0 & 1 & 0 \\ 0 & 0 & 1 \\ 1 & 0 & 0 \\ 1 & 0 & 0 \end{bmatrix}, \begin{bmatrix} 0 & 1 & 0 \\ 0 & 0 & 1 \\ 1 & 0 & 0 \\ -1 & 0 & 0 \end{bmatrix}.$$

In another aspect of the present invention, a Node B for receiving uplink signals of a user equipment (UE) includes one or multiple antennas for transmitting and receiving signals, a memory for storing a codebook used for receiving three layer signals transmitted by the UE via four antennas of the UE, and a processor connected to the antennas and the memory so as to process reception of the uplink signals, wherein the processor is configured to process the received signals using a specific precoding matrix selected from among the codebook stored in the memory, wherein the codebook consists of 6 precoding matrix groups of $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

and $\begin{bmatrix} 0 & 1 & 0 \\ 0 & 0 & 1 \\ 1 & 0 & 0 \\ X & 0 & 0 \end{bmatrix}$ (where X is a complex variable having an amplitude of 1).

The memory may store, as the codebook, 12 precoding matrices of $$\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}, \begin{bmatrix} 1 & 0 & 0 \\ 0 & 1 & 0 \\ 1 & 0 & 0 \\ 0 & 0 & 1 \end{bmatrix}, \begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ 0 & 0 & 1 \\ 1 & 0 & 0 \end{bmatrix},$$

$$\begin{bmatrix} 1 & 0 & 0 \\ 0 & 1 & 0 \\ 0 & 0 & 1 \\ -1 & 0 & 0 \end{bmatrix}, \begin{bmatrix} 0 & 1 & 0 \\ 1 & 0 & 0 \\ 1 & 0 & 0 \\ 0 & 0 & 1 \end{bmatrix}, \begin{bmatrix} 0 & 1 & 0 \\ 1 & 0 & 0 \\ -1 & 0 & 0 \\ 0 & 0 & 1 \end{bmatrix}, \begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix},$$

$$\begin{bmatrix} 0 & 1 & 0 \\ 0 & 0 & 1 \\ 1 & 0 & 0 \\ 1 & 0 & 0 \end{bmatrix}, \begin{bmatrix} 0 & 1 & 0 \\ 0 & 0 & 1 \\ 1 & 0 & 0 \\ -1 & 0 & 0 \end{bmatrix}.$$

As described above, a method for transmitting and receiving uplink signals according to the embodiments of the present invention may transmit and receive using the above-mentioned optimized 4Tx rank 3 codebook, transmit uplink signals by reflecting a channel situation using a small amount of signaling overhead in various ways, and solve a PAPR problem. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. Also, wherever possible, the same reference numbers will be used throughout the drawings to refer to the same or like parts. Peak power to Average Power Ratio (PAPR) is a parameter indicating characteristics of a waveform. PAPR is a specific value acquired when a peak amplitude of the waveform is divided by a time-averaged Root Mean Square (RMS) value of the waveform. PAPR is a dimensionless value. In general, a PAPR of a single carrier signal is better than that of a multi-carrier signal. Cubic Metric (CM) is another specific value to describe a waveform characteristic which is similar to PAPR.

An LTE-Advanced scheme can implement MIMO technology using Single Carrier-Frequency Division Multiple Access (SC-FDMA) so as to maintain a superior CM property. When using general precoding, a signal including information corresponding to several layers is multiplexed and transmitted via a single antenna, so that the signal transmitted via this antenna may be considered to be a kind of multi-carrier signal. PAPR is associated with a dynamic range that must be supported by a power amplifier of a transmitter, and a CM value is another value capable of being used as a substitute for the PAPR.

Figure 1:
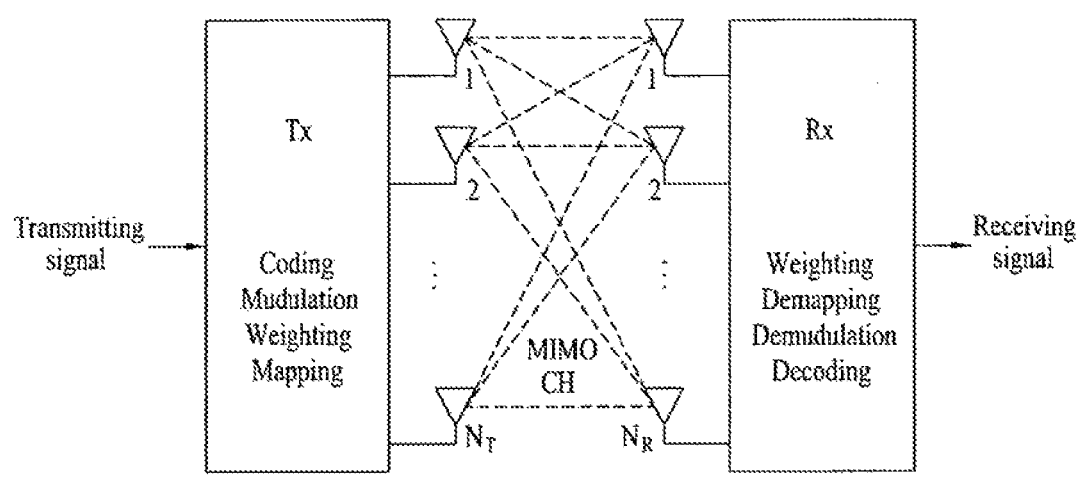
FIG. 1 is a conceptual diagram illustrating a general MIMO communication system.
Figure 2:
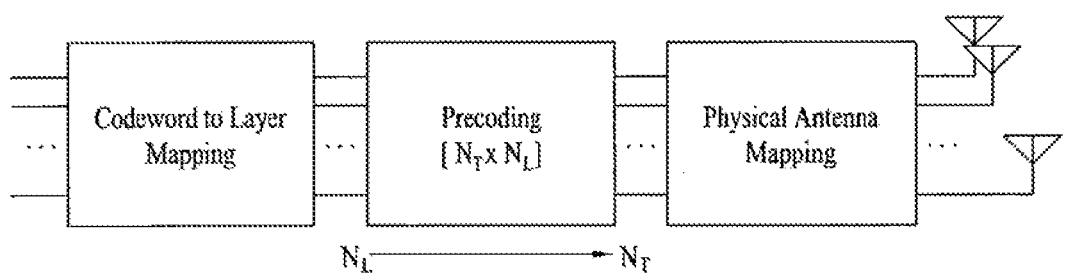
FIG. 2 illustrates a general structure of a transmitter based on MIMO technology.

FIG. 2 shows a general structure of a transmitter based on MIMO technology.

In FIG. 2, one or more codewords are mapped to a plurality of layers. In this case, mapping information is mapped to each physical antenna by a precoding process, and is then transmitted via each physical antenna.

Figure 3:
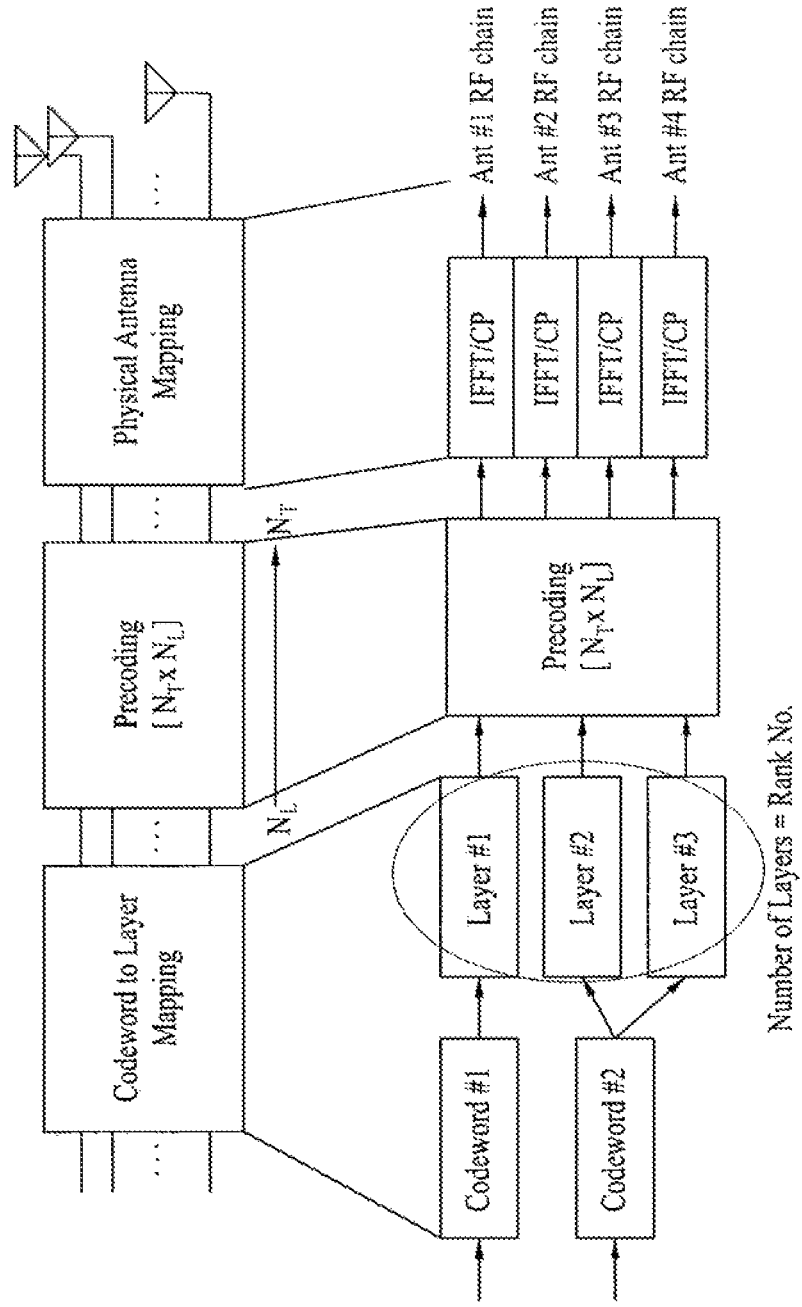
FIG. 3 is a detailed diagram illustrating the general structure shown in FIG. 2.

FIG. 3 is a detailed block diagram illustrating the MIMO-based transmitter shown in FIG. 2.

The term 'codeword' indicates that Cyclic Redundancy Check (CRC) bits are attached to data information and are then encoded by a specific coding method. There are a variety of coding methods, for example, a turbo code, a tail biting convolution code, and the like. Each codeword is mapped to one or more layers (i.e., one or more virtual layers), and a total number of mapped layers is equal to a rank value. In other words, if a transmission rank is 3, a total number of transmission layers is also set to 3. Information mapped to each layer is precoded. In this case, data information mapped to each layer is mapped to a physical layer through a precoding process (where, the term 'layer' means a virtual layer as far as it especially designates a physical layer). Information is transmitted to each antenna via each physical layer. Under the condition that no specified explanation is shown in FIG. 3, the precoding is carried out in a frequency domain, and an OFDM information transmission scheme is used for information mapped to the physical layer. The information mapped to the physical layer is mapped to a specific frequency domain, and is then IFFT-processed. After that, a cyclic prefix (CP) is attached to the IFFT result. Thereafter, information is transmitted to each antenna via a radio frequency (RF) chain.

The precoding process may be carried out by matrix multiplication. In each of the matrices, the number of rows is equal to the number of physical layers (i.e., the number of antennas), and the number of columns is equal to a rank value. The rank value is equal to the number of layers, so that the number of columns is equal to the number of layers. Referring to the following equation 2, information mapped to a layer (i.e., a virtual layer) is $x_1$ and $x_2$, each element $p_{ij}$ of a (4×2) matrix is a weight used for precoding. $y_1$, $y_2$, $y_3$, and $y_4$ are information mapped to physical layers, and are transmitted via respective antennas using individual OFDM transmission schemes.

$$\begin{bmatrix} y_1 \\ y_2 \\ y_3 \\ y_4 \end{bmatrix} = \begin{bmatrix} p_{11} & p_{21} \\ p_{12} & p_{22} \\ p_{13} & p_{23} \\ p_{14} & p_{24} \end{bmatrix} \cdot \begin{bmatrix} x_1 \\ x_2 \end{bmatrix} \quad \text{[Equation 2]}$$

In the following description, a virtual layer will hereinafter be referred to as a layer so long as such use will not lead to confusion. An operation for mapping a virtual layer signal to a physical layer will hereinafter be considered to be an operation for directly mapping a layer to an antenna.

The precoding method can be mainly classified into two methods, i.e., a wideband precoding method and a subband precoding method.

The wideband precoding method is as follows. According to the wideband precoding method, when precoding is carried out in a frequency domain, the same precoding matrix is applied to all information transmitted to the frequency domain.

Figure 4:
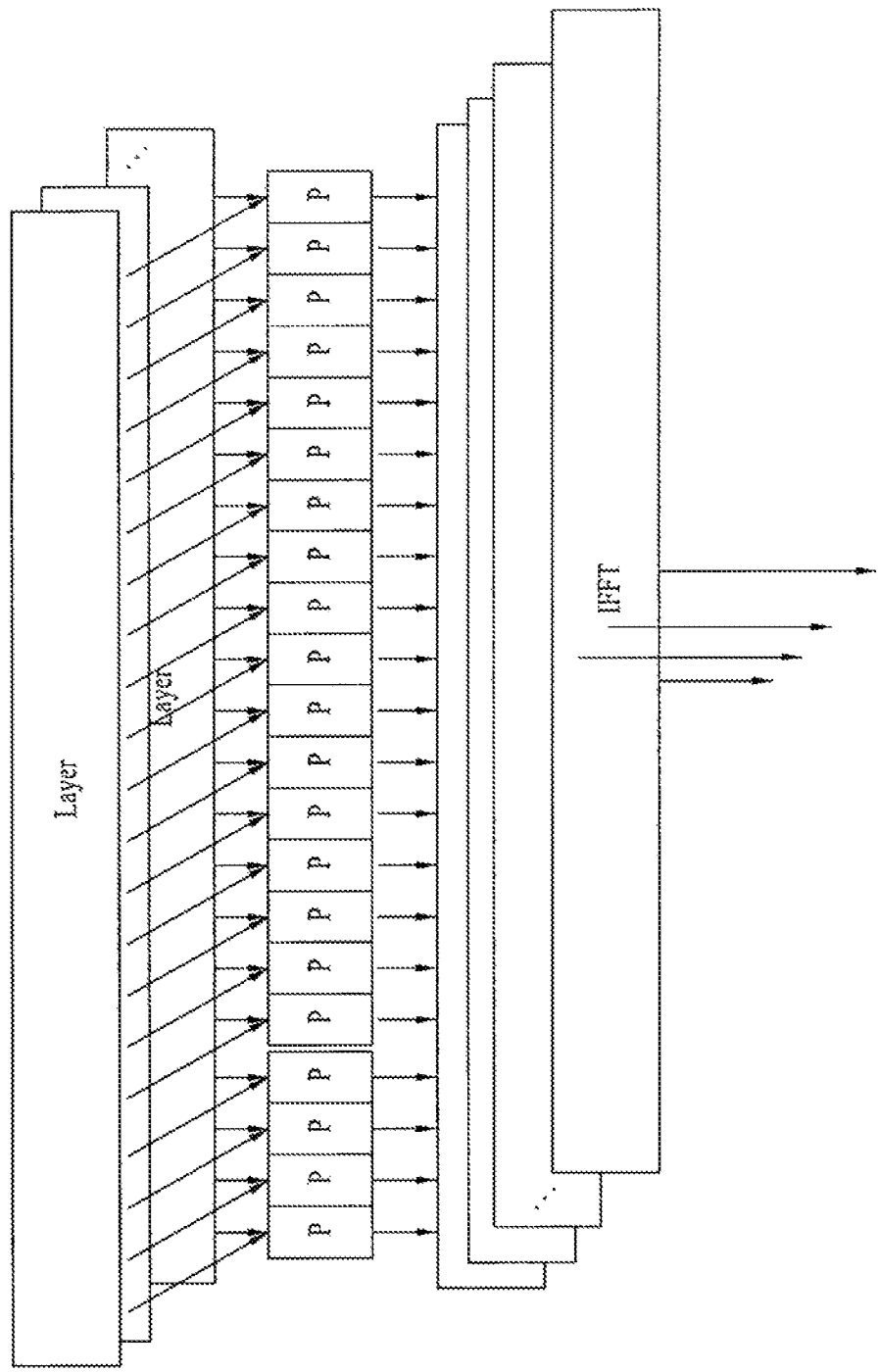
FIG. 4 is a conceptual diagram illustrating a method for precoding information of each layer and transmitting the precoded information via an antenna.

FIG. 4 is a conceptual diagram illustrating a method for precoding information of each layer and transmitting the precoded information via an antenna.

Referring to FIG. 4, it can be recognized that information corresponding to a plurality of layers is precoded while being classified according to subcarriers of each frequency domain, and the precoded information is transmitted via each antenna. All precoding matrices 'p' in the wideband precoding method are equal to each other.

The subband precoding method is provided by the extension of the wideband precoding method. The subband precoding method applies a variety of precoding matrices to each subcarrier without applying the same precoding matrix to all subcarriers. In other words, according to the subband precoding method, a precoding matrix 'P' is used in a specific subcarrier, and another precoding matrix 'M' is used in the remaining subcarriers other than the specific subcarrier.

Herein, element values of the precoding matrix 'P' are different from those of the other precoding matrix 'M'.

Uplink signal transmission is relatively sensitive to PAPR or CM properties as compared to downlink signal transmission. The increase of power amplifier costs caused by the increase of PAPR or CM properties may generate more serious problems in a user equipment (UE). Thus, the SC-FDMA scheme is used for uplink signal transmission.

Figure 5:
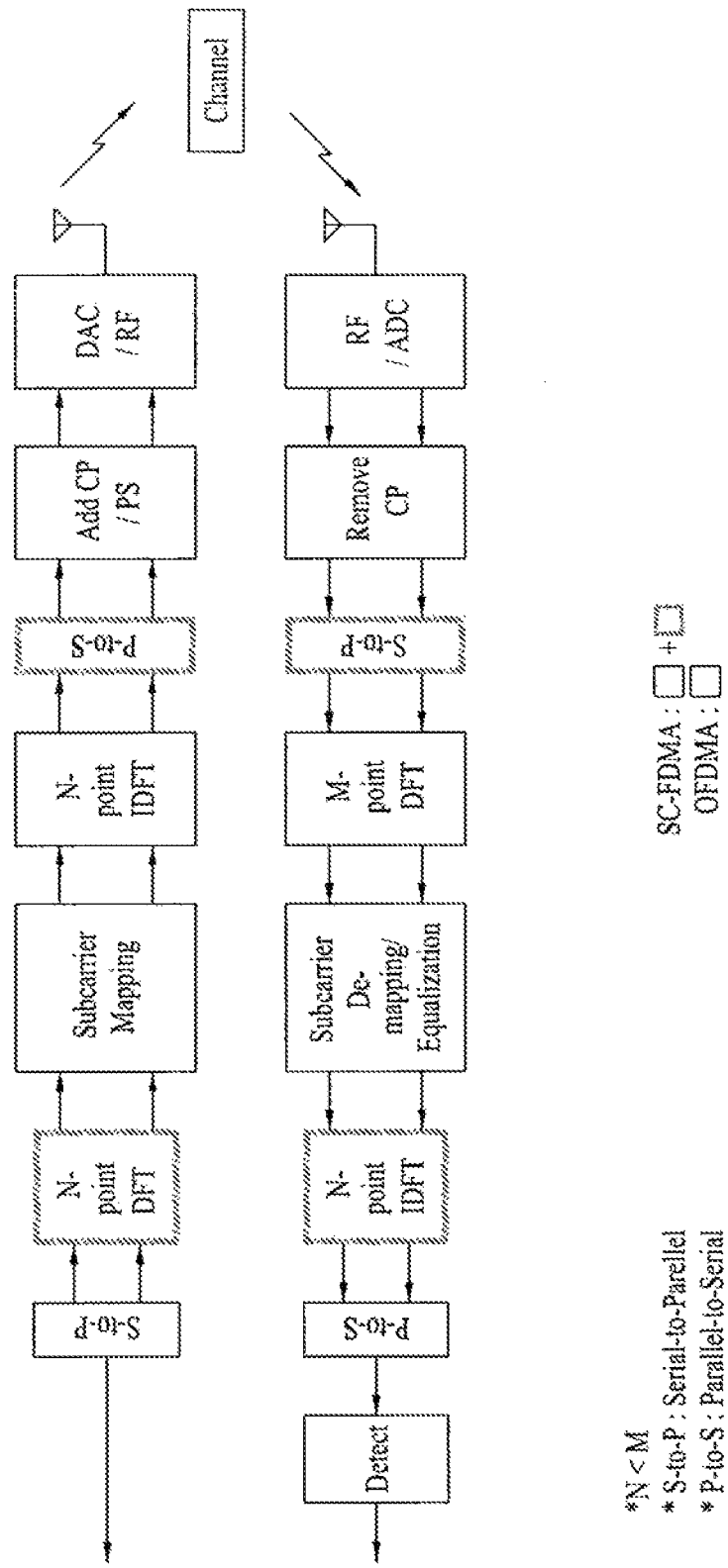
FIG. 5 is a conceptual diagram illustrating a general SC-FDMA scheme.

FIG. 5 is a conceptual diagram illustrating a general SC-FDMA scheme.

As shown in FIG. 5, the OFDM scheme and the SC-FDMA scheme are considered to be identical to some extent with each other, because they convert a serial signal into parallel signals, map the parallel signals to subcarriers, perform an IDFT or IFFT process on the mapped signals, convert the IDFT- or IFFT-processed signals into a serial signal, attach a cyclic prefix (CP) to the resultant serial signal, and transmit the CP resultant signal via a radio frequency (RF) module. However, in contrast to the OFDM scheme, the SC-FDMA scheme converts parallel signals into a serial signal, and performs DFT spreading upon the serial signal, so that it reduces the influence of a next IDFT or IFFT process and maintains a single signal characteristic of more than a predetermined level as much as possible.

In the meantime, the reason why the CM value is degraded when a MIMO scheme is applied to uplink signal transmission is as follows. If a plurality of single-carrier signals each having good CM properties is simultaneously overlapped with each other, the overlapped signals may have poor CM properties. Therefore, if the SC-FDMA system multiplexes output information of several layers using a minimum number of single-carrier signals or one single-carrier signal on a single physical antenna, a transmission signal having a good CM can be generated.

A codeword-layer mapping process may be performed before information to be transmitted is precoded. Since the SC-FDMA scheme is generally used for one transmission mode (1Tx), the number of layers is 1. However, if the SC-FDMA scheme supports a MIMO scheme, the number of layers is plural, and a codeword composed of a single transport block may be mapped to a plurality of layers.

Figure 6:
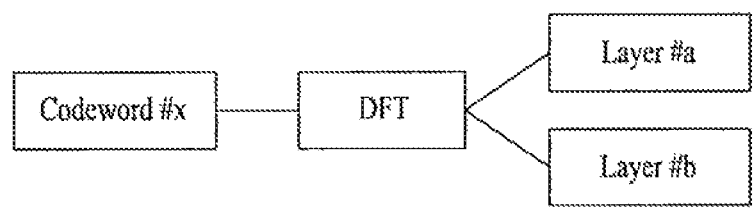
FIG. 6 is a conceptual diagram illustrating a method for mapping a codeword to several layers.

FIG. 6 is a conceptual diagram illustrating a method for mapping a codeword to several layers.

Referring to FIG. 6, if the codeword-layer mapping is carried out after a DFT process for the SC-FDMA scheme is performed, a CM value may be increased. That is, because an output signal of a DFT block undergoes other processes before entering an IFFT module, i.e., because the output signal of the DFT block is divided into two layers, a CM value may be increased.

Figure 7:
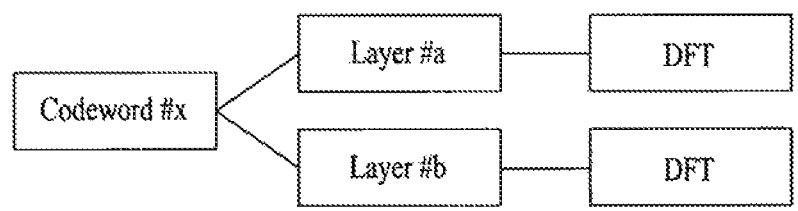
FIG. 7 is a conceptual diagram illustrating a method for performing DFT upon each layer after performing codeword-to-layer mapping (i.e., codeword-layer mapping) so as to prevent a CM value for each antenna from being increased.

FIG. 7 is a conceptual diagram illustrating a method for performing DFT upon each layer after performing codeword-to-layer mapping (i.e., a codeword-layer mapping) so as to prevent a CM value for each antenna from being increased.

Therefore, if the number of DFT blocks is changed while being classified according to layer numbers based on a rank value, a low CM value can be maintained. That is, the output signal of the DFT block is directly input to the IFFT block without passing through other processes, so that a low CM value can be maintained. In the case of actual implementation, a plurality of layers may share a single DFT block.

If a plurality of layer signals is transmitted via a single antenna by applying the MIMO scheme to uplink signal transmission, a PAPR or a CM property may be deteriorated. In order to overcome the above-mentioned problem, the following embodiments of the present invention will describe a method for designing a codebook based on a precoding matrix by which only one layer signal is transmitted via a single antenna. In addition, the principle of designing a codebook that includes an appropriate number of precoding matrices and maximizes a chordal distance among precoding matrices of the codebook will hereinafter be described in detail.

Next, a chordal distance will firstly be described, and an uplink codebook (specifically, a codebook for use in both 4-antenna and Rank 3 transmission) and a method for transmitting and receiving a signal using the codebook will hereinafter be described in detail.

One embodiment of the present invention provides a method for generating a 4Tx-rank 3 codebook using 6 precoding matrices shown in the following Table 1. The equivalent precoding matrices shown in Table 1 generate the same Signal to Interference and Noise Ratio (SINR) value given a channel condition. In the following embodiments, it is assumed that a codeword-to-layer mapping (also called a codeword-layer mapping) for use in rank 3 transmission is carried out as shown in FIG. 3. That is, it is assumed that Codeword 1 is mapped to Layer 1 and Codeword 2 is equally mapped to Layer 2 and Layer 3 in units of a symbol.

TABLE 1

| | General Group codebook form | Equivalent precoding matrices | | | | |
|---|---|---|---|---|---|---|
| 1 | $\begin{bmatrix} 1 & 0 & 0 \\ X & 0 & 0 \\ 0 & 1 & 0 \\ 0 & 0 & 1 \end{bmatrix}$ | $\begin{bmatrix} 1 & 0 & 0 \\ X & 0 & 0 \\ 0 & 0 & 1 \\ 0 & 1 & 0 \end{bmatrix}$ | $\begin{bmatrix} 0 & 1 & 0 \\ 1 & X & 0 \\ 1 & 0 & 0 \\ 0 & 0 & 1 \end{bmatrix}$ | $\begin{bmatrix} 0 & 1 & 0 \\ 0 & X & 0 \\ 0 & 0 & 1 \\ 1 & 0 & 0 \end{bmatrix}$ | $\begin{bmatrix} 0 & 0 & 1 \\ 0 & 0 & X \\ 1 & 0 & 0 \\ 0 & 1 & 0 \end{bmatrix}$ | $\begin{bmatrix} 0 & 0 & 1 \\ 0 & 0 & X \\ 0 & 1 & 0 \\ 1 & 0 & 0 \end{bmatrix}$ |
| 2 | $\begin{bmatrix} 1 & 0 & 0 \\ 0 & 1 & 0 \\ X & 0 & 0 \\ 0 & 0 & 1 \end{bmatrix}$ | $\begin{bmatrix} 1 & 0 & 0 \\ 0 & 1 & 0 \\ X & 0 & 0 \\ 0 & 0 & 1 \end{bmatrix}$ | $\begin{bmatrix} 0 & 1 & 0 \\ 1 & 0 & 0 \\ 0 & X & 0 \\ 0 & 0 & 1 \end{bmatrix}$ | $\begin{bmatrix} 0 & 1 & 0 \\ 0 & 0 & 1 \\ 0 & X & 0 \\ 1 & 0 & 0 \end{bmatrix}$ | $\begin{bmatrix} 0 & 1 & 0 \\ 1 & 0 & 0 \\ 0 & X & 0 \\ 0 & 0 & 1 \end{bmatrix}$ | $\begin{bmatrix} 0 & 1 & 0 \\ 0 & 0 & 1 \\ 0 & X & 0 \\ 1 & 0 & 0 \end{bmatrix}$ |
| 3 | $\begin{bmatrix} 1 & 0 & 0 \\ 0 & 1 & 0 \\ 0 & 0 & 1 \\ X & 0 & 0 \end{bmatrix}$ | $\begin{bmatrix} 1 & 0 & 0 \\ 0 & 0 & 1 \\ 0 & 1 & 0 \\ X & 0 & 0 \end{bmatrix}$ | $\begin{bmatrix} 0 & 1 & 0 \\ 1 & 0 & 0 \\ 0 & 0 & 1 \\ 0 & X & 0 \end{bmatrix}$ | $\begin{bmatrix} 0 & 1 & 0 \\ 0 & 0 & 1 \\ 1 & 0 & 0 \\ 0 & X & 0 \end{bmatrix}$ | $\begin{bmatrix} 0 & 0 & 1 \\ 1 & 0 & 0 \\ 0 & 1 & 0 \\ 0 & 0 & X \end{bmatrix}$ | $\begin{bmatrix} 0 & 0 & 1 \\ 0 & 1 & 0 \\ 1 & 0 & 0 \\ 0 & 0 & X \end{bmatrix}$ |

TABLE 1-continued

| Group | General codebook form | Equivalent precoding matrices |
|---|---|---|
| 4 | $\begin{bmatrix} 0 & 1 & 0 \\ 1 & 0 & 0 \\ X & 0 & 0 \\ 0 & 0 & 1 \end{bmatrix}$ | $\begin{bmatrix} 0 & 1 & 0 \\ 1 & 0 & 0 \\ X & 0 & 0 \\ 0 & 0 & 1 \end{bmatrix}, \begin{bmatrix} 1 & 0 & 0 \\ 0 & 1 & 0 \\ 0 & X & 0 \\ 0 & 0 & 1 \end{bmatrix}, \begin{bmatrix} 0 & 0 & 1 \\ 0 & 1 & 0 \\ 0 & X & 0 \\ 1 & 0 & 0 \end{bmatrix}, \begin{bmatrix} 1 & 0 & 0 \\ 0 & 0 & 1 \\ 0 & 0 & X \\ 0 & 1 & 0 \end{bmatrix}, \begin{bmatrix} 0 & 1 & 0 \\ 0 & 0 & 1 \\ 0 & 0 & X \\ 1 & 0 & 0 \end{bmatrix}$ |
| 5 | $\begin{bmatrix} 0 & 1 & 0 \\ 1 & 0 & 0 \\ 0 & 0 & 1 \\ X & 0 & 0 \end{bmatrix}$ | $\begin{bmatrix} 0 & 0 & 0 \\ 1 & 0 & 1 \\ 0 & 1 & 0 \\ X & 0 & 0 \end{bmatrix}, \begin{bmatrix} 1 & 0 & 0 \\ 0 & 1 & 0 \\ 0 & 0 & 1 \\ 0 & X & 0 \end{bmatrix}, \begin{bmatrix} 0 & 0 & 1 \\ 0 & 1 & 0 \\ 1 & 0 & 0 \\ 0 & X & 0 \end{bmatrix}, \begin{bmatrix} 1 & 0 & 0 \\ 0 & 0 & 1 \\ 0 & 1 & 0 \\ 0 & 0 & X \end{bmatrix}, \begin{bmatrix} 0 & 1 & 0 \\ 0 & 0 & 1 \\ 1 & 0 & 0 \\ 0 & 0 & X \end{bmatrix}$ |
| 6 | $\begin{bmatrix} 0 & 1 & 0 \\ 0 & 0 & 1 \\ 1 & 0 & 0 \\ X & 0 & 0 \end{bmatrix}$ | $\begin{bmatrix} 0 & 1 & 0 \\ 0 & 0 & 1 \\ 1 & 0 & 0 \\ X & 0 & 0 \end{bmatrix}, \begin{bmatrix} 1 & 0 & 0 \\ 0 & 0 & 1 \\ 0 & 1 & 0 \\ 0 & X & 0 \end{bmatrix}, \begin{bmatrix} 0 & 0 & 1 \\ 1 & 0 & 0 \\ 0 & 1 & 0 \\ 0 & X & 0 \end{bmatrix}, \begin{bmatrix} 1 & 0 & 0 \\ 0 & 1 & 0 \\ 0 & 0 & 1 \\ 0 & 0 & X \end{bmatrix}, \begin{bmatrix} 0 & 1 & 0 \\ 1 & 0 & 0 \\ 0 & 0 & 1 \\ 0 & 0 & X \end{bmatrix}$ |

The precoding matrix for use in actual uplink signal transmission and reception is configured in a multiplication format in which each precoding matrix shown in Table 1 is multiplied by a specific constant. In the following description, the constant multiplied by each precoding matrix will herein be omitted for convenience of description otherwise the constant is mentioned.

In the meantime, it can be shown that permutation between specific columns does not affect SINR performance. For example, although a precoding matrix [C1, C2, C3] is modified into another precoding matrix [C1, C3, C2], this modification is considered to merely be codeword swapping, and has no change in total sum of resultant SINR values. In the following description, only "General Codebook Form" in each of 6 precoding matrix groups shown in Table 1 will hereinafter be described, but equivalent precoding matrices will not be described.

On the other hand, the codebook shown in Table 1 may include a variety of precoding matrices according to X values of precoding matrices. If the X value is any one of QPSK alphabets (such as 1, −1, j and −j), the following precoding matrix groups may be obtained as represented by the following Table 2.

TABLE 2

| Gr | Equation | Codebook subsets |
|---|---|---|
| Gr1 | $\begin{bmatrix} 1 & 0 & 0 \\ X & 0 & 0 \\ 0 & 1 & 0 \\ 0 & 0 & 1 \end{bmatrix}$ | $\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}, \begin{bmatrix} 1 & 0 & 0 \\ j & 0 & 0 \\ 0 & 1 & 0 \\ 0 & 0 & 1 \end{bmatrix}, \begin{bmatrix} 1 & 0 & 0 \\ -j & 0 & 0 \\ 0 & 1 & 0 \\ 0 & 0 & 1 \end{bmatrix}$ |
| Gr2 | $\begin{bmatrix} 1 & 0 & 0 \\ 0 & 1 & 0 \\ X & 0 & 0 \\ 0 & 0 & 1 \end{bmatrix}$ | $\begin{bmatrix} 1 & 0 & 0 \\ 0 & 1 & 0 \\ 1 & 0 & 0 \\ 0 & 0 & 1 \end{bmatrix}, \begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ j & 0 & 0 \\ 0 & 0 & 1 \end{bmatrix}, \begin{bmatrix} 1 & 0 & 0 \\ 0 & 1 & 0 \\ -j & 0 & 0 \\ 0 & 0 & 1 \end{bmatrix}$ |
| Gr3 | $\begin{bmatrix} 1 & 0 & 0 \\ 0 & 1 & 0 \\ 0 & 0 & 1 \\ X & 0 & 0 \end{bmatrix}$ | $\begin{bmatrix} 1 & 0 & 0 \\ 0 & 1 & 0 \\ 0 & 0 & 1 \\ 1 & 0 & 0 \end{bmatrix}, \begin{bmatrix} 1 & 0 & 0 \\ 0 & 1 & 0 \\ 0 & 0 & 1 \\ -1 & 0 & 0 \end{bmatrix}, \begin{bmatrix} 1 & 0 & 0 \\ 0 & 1 & 0 \\ 0 & 0 & 1 \\ j & 0 & 0 \end{bmatrix}, \begin{bmatrix} 1 & 0 & 0 \\ 0 & 1 & 0 \\ 0 & 0 & 1 \\ -j & 0 & 0 \end{bmatrix}$ |
| Gr4 | $\begin{bmatrix} 0 & 1 & 0 \\ 1 & 0 & 0 \\ X & 0 & 0 \\ 0 & 0 & 1 \end{bmatrix}$ | $\begin{bmatrix} 0 & 1 & 0 \\ 1 & 0 & 0 \\ 1 & 0 & 0 \\ 0 & 0 & 1 \end{bmatrix}, \begin{bmatrix} 0 & 1 & 0 \\ 1 & 0 & 0 \\ -1 & 0 & 0 \\ 0 & 0 & 1 \end{bmatrix}, \begin{bmatrix} 0 & 1 & 0 \\ 1 & 0 & 0 \\ j & 0 & 0 \\ 0 & 0 & 1 \end{bmatrix}, \begin{bmatrix} 0 & 1 & 0 \\ 1 & 0 & 0 \\ -j & 0 & 0 \\ 0 & 0 & 1 \end{bmatrix}$ |
| Gr5 | $\begin{bmatrix} 0 & 1 & 0 \\ 1 & 0 & 0 \\ 0 & 0 & 1 \\ X & 0 & 0 \end{bmatrix}$ | $\begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix}, \begin{bmatrix} 0 & 1 & 0 \\ 1 & 0 & 0 \\ 0 & 0 & 1 \\ j & 0 & 0 \end{bmatrix}, \begin{bmatrix} 0 & 1 & 0 \\ 1 & 0 & 0 \\ 0 & 0 & 1 \\ -j & 0 & 0 \end{bmatrix}$ |
| Gr6 | $\begin{bmatrix} 0 & 1 & 0 \\ 0 & 0 & 1 \\ 1 & 0 & 0 \\ X & 0 & 0 \end{bmatrix}$ | $\begin{bmatrix} 0 & 1 & 0 \\ 0 & 0 & 1 \\ 1 & 0 & 0 \\ 1 & 0 & 0 \end{bmatrix}, \begin{bmatrix} 0 & 1 & 0 \\ 0 & 0 & 1 \\ 1 & 0 & 0 \\ -1 & 0 & 0 \end{bmatrix}, \begin{bmatrix} 0 & 1 & 0 \\ 0 & 0 & 1 \\ 1 & 0 & 0 \\ j & 0 & 0 \end{bmatrix}, \begin{bmatrix} 0 & 1 & 0 \\ 0 & 0 & 1 \\ 1 & 0 & 0 \\ -j & 0 & 0 \end{bmatrix}$ |

Table 2 illustrates that an X parameter of each precoding matrix group is denoted by $X \in \{\pm 1, \pm j\}$.

The above-mentioned method for using the entirety of the precoding matrices as a 4Tx-rank 3 codebook can also be used. One embodiment of the present invention provides a method for designing a codebook that includes a maximum chordal distance among precoding matrices contained in the codebook using the chordal distance concept and at the same time includes an optimized number of precoding matrices.

Figure 8:
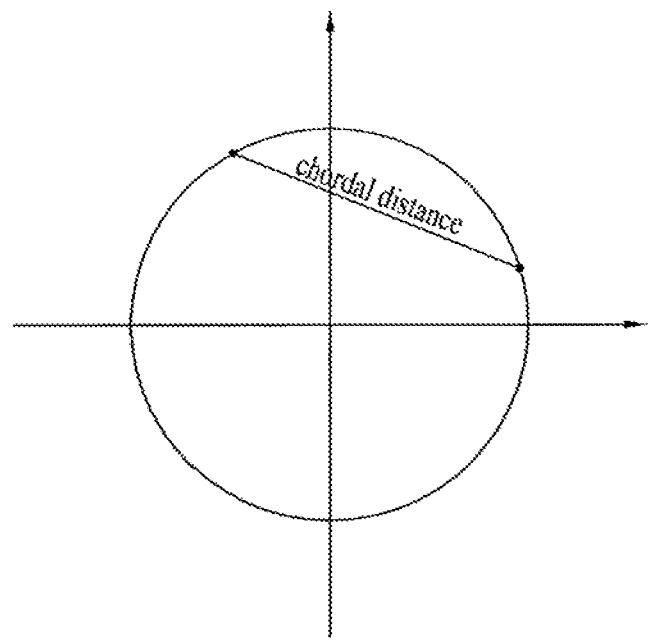
FIG. 8 is a conceptual diagram illustrating a chordal distance.

FIG. 8 is a conceptual diagram illustrating a chordal distance.

A chordal distance is well known as one of norms (or standards) for comparing performances of various codebook sets. Herein, the term "chordal" indicates a straight line between two points located at the circumference. Therefore, given a two-dimensional (2D) case, a chordal distance indicates a distance between two points located at the circumference of a circle (e.g., a unit circle) as shown in FIG. 8. Generally, it is preferable that a codebook including precoding matrices, each of which has a long chordal distance, include a variety of precoding matrices to be used in different channel conditions.

There is a need for the 4Tx-codebook to consider a four-dimensional chordal distance, so that the following equation 3 can be used as a chordal distance for selecting a codebook set.

$$d_c(P, Q) = \frac{1}{\sqrt{2}} \|PP^H - QQ^H\|_F \quad \text{[Equation 3]}$$

In Equation 3, P is P=[$v_1, v_2 \ldots v_N$], and Q is Q=[$u_1\ u_2 \ldots u_N$], where $v_i$ and $u_i$ (i=1, 2, ... N, N=4 in the case of 4Tx antennas) are principal vectors of the matrices P and Q, respectively. In addition, $$\|A\|_F = \sqrt{\sum_{i=1}^{m}\sum_{j=1}^{n}|a_{ij}|^2} = \sqrt{\text{trace}(AA^H)}$$

is the Frobenius norm of the matrix. The above-mentioned chordal distance can also be measured by the following equation 4.

$$d_c(P, Q) = \frac{1}{\sqrt{2}}\|PP^H - QQ^H\|_F = \sqrt{n - \text{trace}(AA^H BB^H)} \quad \text{[Equation 4]}$$

where A and B are orthonormal generation magtrices for P and Q respectively

The above-mentioned codebook design for the 4Tx system based on four transmission antennas will be described using the above-mentioned chordal distance concept.

First, the chordal distance among 6 precoding matrix groups can be calculated as follows.

A chordal distance between a precoding matrix $X_i$ of the precoding matrix group $Gr_i$ and a precoding matrix $X_j$ of the precoding matrix group $Gr_j$ is dependent upon a trace $(X_iX_i^H - X_jX_j^H)(X_iX_i^H - X_jX_j^H)^H$. This trace may reflect a distance between $X_iX_i^H$ and $X_jX_j^H$. The number of cases in which two pairs are selected from among the above 6 groups is set to a relatively high number, e.g., $$15\left(=\binom{6}{2}\right),$$

such that the following description will consider and disclose only a difference between two precoding matrices selected from among different groups. First, the following values will be calculated as represented by the following equation 5.

$$X_1 X_1^H = \frac{1}{\sqrt{2}}\begin{bmatrix} 1 & 0 & 0 \\ x_1 & 0 & 0 \\ 0 & \sqrt{2} & 0 \\ 0 & 0 & \sqrt{2} \end{bmatrix} \times \frac{1}{\sqrt{2}}\begin{bmatrix} 1 & x_1^* & 0 & 0 \\ 0 & 0 & \sqrt{2} & 0 \\ 0 & 0 & 0 & \sqrt{2} \end{bmatrix} = \quad \text{[Equation 5]}$$

$$\frac{1}{2}\begin{bmatrix} 1 & x_1^* & 0 & 0 \\ x_1 & |x_1|^2 & 0 & 0 \\ 0 & 0 & 2 & 0 \\ 0 & 0 & 0 & 2 \end{bmatrix}$$

$$X_2 X_2^H = \frac{1}{\sqrt{2}}\begin{bmatrix} 1 & 0 & 0 \\ 0 & \sqrt{2} & 0 \\ x_2 & 0 & 0 \\ 0 & 0 & \sqrt{2} \end{bmatrix} \times \frac{1}{\sqrt{2}}\begin{bmatrix} 1 & 0 & x_2^* & 0 \\ 0 & \sqrt{2} & 0 & 0 \\ 0 & 0 & 0 & \sqrt{2} \end{bmatrix} =$$

$$\frac{1}{2}\begin{bmatrix} 1 & 0 & x_2^* & 0 \\ 0 & 2 & 0 & 0 \\ x_2 & 0 & |x_2|^2 & 0 \\ 0 & 0 & 0 & 2 \end{bmatrix}$$

$$X_3 X_3^H = \frac{1}{\sqrt{2}}\begin{bmatrix} 1 & 0 & 0 \\ 0 & \sqrt{2} & 0 \\ 0 & 0 & \sqrt{2} \\ x_3 & 0 & 0 \end{bmatrix} \times \frac{1}{\sqrt{2}}\begin{bmatrix} 1 & 0 & 0 & x_3^* \\ 0 & \sqrt{2} & 0 & 0 \\ 0 & 0 & \sqrt{2} & 0 \end{bmatrix} =$$

$$\frac{1}{2}\begin{bmatrix} 1 & 0 & 0 & x_3^* \\ 0 & 2 & 0 & 0 \\ 0 & 0 & 2 & 0 \\ x_3 & 0 & 0 & |x_3|^2 \end{bmatrix}$$

$$X_4 X_4^H = \frac{1}{\sqrt{2}}\begin{bmatrix} 0 & \sqrt{2} & 0 \\ 1 & 0 & 0 \\ x_4 & 0 & 0 \\ 0 & 0 & \sqrt{2} \end{bmatrix} \times \frac{1}{\sqrt{2}}\begin{bmatrix} 0 & 1 & x_4^* & 0 \\ \sqrt{2} & 0 & 0 & 0 \\ 0 & 0 & 0 & \sqrt{2} \end{bmatrix} =$$

$$\frac{1}{2}\begin{bmatrix} 2 & 0 & 0 & 0 \\ 0 & 1 & x_4^* & 0 \\ 0 & x_4 & |x_4|^2 & 0 \\ 0 & 0 & 0 & 2 \end{bmatrix}$$

$$X_5 X_5^H = \frac{1}{\sqrt{2}}\begin{bmatrix} 0 & \sqrt{2} & 0 \\ 1 & 0 & 0 \\ 0 & 0 & \sqrt{2} \\ x_5 & 0 & 0 \end{bmatrix} \times \frac{1}{\sqrt{2}}\begin{bmatrix} 0 & 1 & 0 & x_5^* \\ \sqrt{2} & 0 & 0 & 0 \\ 0 & 0 & \sqrt{2} & 0 \end{bmatrix} =$$

$$\frac{1}{2}\begin{bmatrix} 2 & 0 & 0 & 0 \\ 0 & 1 & 0 & x_5^* \\ 0 & 0 & 2 & 0 \\ 0 & x_5 & 0 & |x_5|^2 \end{bmatrix}$$

$$X_6 X_6^H = \frac{1}{\sqrt{2}}\begin{bmatrix} 0 & \sqrt{2} & 0 \\ 0 & 0 & \sqrt{2} \\ 1 & 0 & 0 \\ x_6 & 0 & 0 \end{bmatrix} \times \frac{1}{\sqrt{2}}\begin{bmatrix} 0 & 0 & 1 & x_6^* \\ \sqrt{2} & 0 & 0 & 0 \\ 0 & \sqrt{2} & 0 & 0 \end{bmatrix} =$$

$$\frac{1}{2}\begin{bmatrix} 2 & 0 & 0 & 0 \\ 0 & 2 & 0 & 0 \\ 0 & 0 & 2 & x_6^* \\ 0 & 0 & x_6 & |x_6|^2 \end{bmatrix}$$

In Equation 5, Xi is a precoding matrix belonging to the group i. A difference between a precoding matrix of the group 1 and a precoding matrix of another group can be represented by the following equation 6.

$$X_1 X_1^H - X_2 X_2^H = \frac{1}{2}\begin{bmatrix} 0 & x_1^* & -x_2^* & 0 \\ x_1 & |x_1|^2 - 2 & 0 & 0 \\ -x_2 & 0 & 2-|x_2|^2 & 0 \\ 0 & 0 & 0 & 0 \end{bmatrix} \quad \text{[Equation 6]}$$

-continued $$X_1 X_1^H - X_3 X_3^H = \frac{1}{2}\begin{bmatrix} 0 & x_1^* & 0 & -x_3^* \\ x_1 & |x_1|^2 - 2 & 0 & 0 \\ 0 & 0 & 0 & 0 \\ -x_3 & 0 & 0 & 2 - |x_3|^2 \end{bmatrix}$$

$$X_1 X_1^H - X_4 X_4^H = \frac{1}{2}\begin{bmatrix} -1 & x_1^* & 0 & 0 \\ x_1 & |x_1|^2 - 1 & -x_4^* & 0 \\ 0 & -x_4 & 2 - |x_4|^2 & 0 \\ 0 & 0 & 0 & 0 \end{bmatrix}$$

$$X_1 X_1^H - X_5 X_5^H = \frac{1}{2}\begin{bmatrix} -1 & x_1^* & 0 & 0 \\ x_1 & |x_1|^2 - 1 & 0 & -x_5^* \\ 0 & 0 & 0 & 0 \\ 0 & -x_5 & 0 & 2 - |x_5|^2 \end{bmatrix}$$

$$X_1 X_1^H - X_6 X_6^H = \frac{1}{2}\begin{bmatrix} -1 & x_1^* & 0 & 0 \\ x_1 & |x_1|^2 - 2 & 0 & 0 \\ 0 & 0 & 1 & -x_6^* \\ 0 & 0 & -x_6 & 2 - |x_6|^2 \end{bmatrix}$$

A difference between a precoding matrix of the group 2 and a precoding matrix of another group is represented by the following equation 7.

[Equation 7]

$$X_2 X_2^H - X_3 X_3^H = \frac{1}{2}\begin{bmatrix} 0 & 0 & x_3^* & -x_3^* \\ 0 & 0 & 0 & 0 \\ x_2 & 0 & |x_1|^2 - 2 & 0 \\ -x_3 & 0 & -x_6 & 2 - |x_3|^2 \end{bmatrix}$$

$$X_2 X_2^H - X_4 X_4^H = \frac{1}{2}\begin{bmatrix} -1 & 0 & x_2^* & 0 \\ 0 & 1 & -x_4^* & 0 \\ x_2 & -x_4 & |x_2|^2 - |x_4|^2 & 0 \\ 0 & 0 & 0 & 0 \end{bmatrix}$$

$$X_2 X_2^H - X_5 X_5^H = \frac{1}{2}\begin{bmatrix} -1 & 0 & x_2^* & 0 \\ 0 & 1 & 0 & -x_5^* \\ x_2 & 0 & |x_2|^2 - 2 & 0 \\ 0 & -x_5 & 0 & 2 - |x_5|^2 \end{bmatrix}$$

$$X_2 X_2^H - X_6 X_6^H = \frac{1}{2}\begin{bmatrix} -1 & 0 & x_2^* & 0 \\ 0 & 0 & 0 & 0 \\ x_2 & 0 & |x_2|^2 - 1 & -x_6^* \\ 0 & 0 & -x_6 & 2 - |x_6|^2 \end{bmatrix}$$

In addition, a difference between a precoding matrix of the group 3 and a precoding matrix of another group is represented by the following equation 8.

[Equation 8]

$$X_3 X_3^H - X_4 X_4^H = \frac{1}{2}\begin{bmatrix} -1 & 0 & 0 & x_3^* \\ 0 & 1 & -x_4^* & 0 \\ 0 & -x_4 & 2 - |x_4|^2 & 0 \\ x_3 & 0 & 0 & |x_3|^2 - 2 \end{bmatrix}$$

-continued $$X_3 X_3^H - X_5 X_5^H = \frac{1}{2}\begin{bmatrix} -1 & 0 & 0 & x_3^* \\ 0 & 1 & 0 & -x_5^* \\ 0 & 0 & 0 & 0 \\ x_3 & -x_5 & 0 & |x_3|^2 - |x_5|^2 \end{bmatrix}$$

$$X_3 X_3^H - X_6 X_6^H = \frac{1}{2}\begin{bmatrix} -1 & 0 & 0 & x_3^* \\ 0 & 0 & 0 & 0 \\ 0 & 0 & 1 & -x_6^* \\ x_3 & 0 & -x_6 & |x_3|^2 - |x_6|^2 \end{bmatrix}$$

In addition, a difference between a precoding matrix of the group 4 and a precoding matrix of another group is represented by the following equation 9.

$$X_4 X_4^H - X_5 X_5^H = \frac{1}{2}\begin{bmatrix} 0 & 0 & 0 & 0 \\ 0 & 0 & x_4^* & -x_5^* \\ 0 & x_4 & |x_4|^2 - 2 & 0 \\ 0 & -x_5 & 0 & 2 - |x_5|^2 \end{bmatrix}$$ [Equation 9]

-continued $$X_4 X_4^H - X_6 X_6^H = \frac{1}{2}\begin{bmatrix} 0 & 0 & 0 & 0 \\ 0 & -1 & x_4^* & 0 \\ 0 & x_4 & |x_4|^2 - 1 & -x_6^* \\ 0 & 0 & -x_6 & 2 - |x_6|^2 \end{bmatrix}$$

Finally, a difference between a precoding matrix of the group 5 and a precoding matrix of the group 6 is represented by the following equation 10.

[Equation 10]

$$X_5 X_5^H - X_6 X_6^H = \frac{1}{2}\begin{bmatrix} 0 & 0 & 0 & 0 \\ 0 & -1 & 0 & x_5^* \\ 0 & 0 & 1 & -x_6^* \\ 0 & x_5 & -x_6 & |x_5|^2 - |x_6|^2 \end{bmatrix}$$

It should be noted that variables shown in Equations 6 to 10 are located in a unit circle. In addition, Equations 6 to 10 can be simplified as shown in the following equations 11 and 12.

[Equation 11]

$$\begin{cases} X_1 X_1^H - X_2 X_2^H = \frac{1}{2}\begin{bmatrix} 0 & x_1^* & -x_2^* & 0 \\ x_1 & -1 & 0 & 0 \\ -x_2 & 0 & 1 & 0 \\ 0 & 0 & 0 & 0 \end{bmatrix} \quad X_1 X_1^H - X_3 X_3^H = \frac{1}{2}\begin{bmatrix} 0 & x_1^* & 0 & -x_3^* \\ x_1 & -1 & 0 & 0 \\ 0 & 0 & 0 & 0 \\ -x_3 & 0 & 0 & 1 \end{bmatrix} \\ X_1 X_1^H - X_4 X_4^H = \frac{1}{2}\begin{bmatrix} -1 & x_1^* & 0 & 0 \\ x_1 & 0 & -x_4^* & 0 \\ 0 & -x_4 & 1 & 0 \\ 0 & 0 & 0 & 0 \end{bmatrix} \quad X_1 X_1^H - X_5 X_5^H = \frac{1}{2}\begin{bmatrix} -1 & x_1^* & 0 & 0 \\ x_1 & 0 & 0 & -x_5^* \\ 0 & 0 & 0 & 0 \\ 0 & -x_5 & 0 & 1 \end{bmatrix} \end{cases}$$

$$\begin{cases} X_2 X_2^H - X_3 X_3^H = \frac{1}{2}\begin{bmatrix} 0 & 0 & x_2^* & -x_3^* \\ 0 & 0 & 0 & 0 \\ x_2 & 0 & -1 & 0 \\ -x_3 & 0 & 0 & 1 \end{bmatrix} \quad X_2 X_2^H - X_4 X_4^H = \frac{1}{2}\begin{bmatrix} -1 & 0 & x_2^* & 0 \\ 0 & 1 & -x_4^* & 0 \\ x_2 & -x_4 & 0 & 0 \\ 0 & 0 & 0 & 0 \end{bmatrix} \\ X_2 X_2^H - X_6 X_6^H = \frac{1}{2}\begin{bmatrix} -1 & 0 & x_2^* & 0 \\ 0 & 0 & 0 & 0 \\ x_2 & 0 & 0 & -x_6^* \\ 0 & 0 & -x_6 & 1 \end{bmatrix} \end{cases}$$

$$\begin{cases} X_3 X_3^H - X_5 X_5^H = \frac{1}{2}\begin{bmatrix} -1 & 0 & 0 & x_3^* \\ 0 & 1 & 0 & -x_5^* \\ 0 & 0 & 0 & 0 \\ x_3 & -x_5 & 0 & 0 \end{bmatrix} \quad X_3 X_3^H - X_6 X_6^H = \\ \qquad \frac{1}{2}\begin{bmatrix} -1 & 0 & 0 & x_3^* \\ 0 & 0 & 0 & 0 \\ 0 & 0 & 1 & -x_6^* \\ x_3 & 0 & -x_6 & 0 \end{bmatrix} \end{cases}$$

$$\begin{cases} X_4 X_4^H - X_5 X_5^H = \frac{1}{2}\begin{bmatrix} 0 & 0 & 0 & 0 \\ 0 & 0 & x_4^* & -x_5^* \\ 0 & x_4 & -1 & 0 \\ 0 & -x_5 & 0 & 1 \end{bmatrix} \quad X_4 X_4^H - X_6 X_6^H = \\ \qquad \frac{1}{2}\begin{bmatrix} 0 & 0 & 0 & 0 \\ 0 & -1 & x_4^* & 0 \\ 0 & x_4 & 0 & -x_6^* \\ 0 & 0 & -x_6 & 1 \end{bmatrix} \end{cases}$$

$$\begin{cases} X_5 X_5^H - X_6 X_6^H = \frac{1}{2}\begin{bmatrix} 0 & 0 & 0 & 0 \\ 0 & -1 & 0 & x_5^* \\ 0 & 0 & 1 & -x_6^* \\ 0 & x_5 & -x_6 & 0 \end{bmatrix} \end{cases}$$

[Equation 12]

$$X_1 X_1^H - X_6 X_6^H = \frac{1}{2}\begin{bmatrix} -1 & x_1^* & 0 & 0 \\ x_1 & -1 & 0 & 0 \\ 0 & 0 & 1 & -x_6^* \\ 0 & 0 & -x_6 & 1 \end{bmatrix}$$

$$X_2 X_2^H - X_5 X_5^H = \frac{1}{2}\begin{bmatrix} -1 & 0 & x_2^* & 0 \\ 0 & 1 & 0 & -x_5^* \\ x_2 & 0 & -1 & 0 \\ 0 & -x_5 & 0 & 1 \end{bmatrix}$$

$$X_3 X_3^H - X_4 X_4^H = \frac{1}{2} \begin{bmatrix} -1 & 0 & 0 & x_3^* \\ 0 & 1 & -x_4^* & 0 \\ 0 & -X_4 & -1 & 0 \\ X_3 & 0 & 0 & -1 \end{bmatrix}$$

The numbers of zero values in a difference $X_i X_i^H - X_j X_j^H$ between different matrices of Equation 11 are the same when $(i,j) \neq (1,6), (6,1), (2,5), (5,2), (3,4)$ or $(4,3)$, but the individual zero values have different positions. In more detail, under the case of $(i,j) \neq (1,6), (6,1), (2,5), (5,2), (3,4)$ or $(4,3)$, a difference matrix includes elements $(+1, -1, x_i, x_i^*, -x_j$ and $-x_j^*)$, each of which is not zero. Therefore, a trace of the difference matrix $X_i X_i^H - X_j X_j^H$ becomes $$\frac{\sqrt{3}}{2}$$

as represented by the following equation 13.

[Equation 13]

$$d_c(X_i, X_j) = \frac{1}{\sqrt{2}} \|X_i X_i^H - X_j X_j^H\|_F = \frac{1}{\sqrt{2}} \sqrt{\frac{\text{trace}((X_i X_i^H - X_j X_j^H)}{(X_i X_i^H - X_j X_j^H)^H)}}$$

$$= \frac{1}{\sqrt{2}} \cdot \sqrt{\frac{1}{4} \cdot (|1|^2 + |-1|^2 + |x_i|^2 + |x_i^*|^2 + |x_j|^2 + |-x_j^*|^2)}$$

$$= \frac{1}{\sqrt{2}} \cdot \sqrt{\frac{1}{4}(1+1+1+1+1+1)}$$

$$= \frac{\sqrt{3}}{2}$$

where $x_i, x_j \in \{e^{j\frac{2\pi}{N} \times 0}, e^{j\frac{2\pi}{N} \times 1}, \ldots, e^{j\frac{2\pi}{N} \times (N-1)}\}$, $N = 2^1, 2^2, 2^3, 2^4, \ldots (i, j) \neq$ $(1, 6), (6, 1), (2, 5), (5, 2), (3, 4)$ or $(4, 3)$ On the other hand, the numbers of zero values in a difference $X_i X_i^H - X_j X_j^H$ between different matrices of Equation 12 are the same when $(i,j) = (1,6), (6,1), (2,5), (5,2), (3,4)$ or $(4,3)$, but the individual 0 values have different positions. In more detail, under the case of $(i,j) = (1,6), (6,1), (2,5), (5,2), (3,4)$ or $(4,3)$, a difference matrix includes elements $(+1, +1, -1, -1, x_i, x_i^*, -x_j$ and $-x_j^*)$, each of which is not identical to zero. Therefore, a trace of the difference matrix $X_i X_i^H - X_j X_j^H$ becomes 1 as represented by the following equation 14.

[Equation 14]

$$d_c(X_i, X_j) = \frac{1}{\sqrt{2}} \|X_i X_i^H - X_j X_j^H\|_F = \frac{1}{\sqrt{2}}$$

$$\sqrt{\text{trace}((X_i X_i^H - X_j X_j^H)(X_i X_i^H - X_j X_j^H)^H)} = \frac{1}{\sqrt{2}} \cdot$$

$$\sqrt{\frac{1}{4} \cdot (2 \times |1|^2 + 2 \times |-1|^2 + |x_i|^2 + |x_i^*|^2 + |-x_j|^2 + |-x_j^*|^2)}$$

$$= \frac{1}{\sqrt{2}} \cdot \sqrt{\frac{1}{4} \cdot (2+2+1+1+1+1)} = 1$$

where $x_i, x_j \in \{e^{j\frac{2\pi}{N} \times 0}, e^{j\frac{2\pi}{N} \times 1}, \ldots, e^{j\frac{2\pi}{N} \times (N-1)}\}, N = 2^1, 2^2, 2^3,$ $2^4, \ldots (i, j) = (1, 6), (6, 1), (2, 5), (5, 2), (3, 4)$ or $(4, 3)$ If the pair of groups shown in Equations 13 and 14 satisfies $(i,j)=(1,6), (6,1), (2,5), (5,2), (3,4)$ or $(4,3)$, a chordal distance of 1 is provided; otherwise, a chordal distance of $$\frac{\sqrt{3}}{2}$$

is provided.

Figure 9:
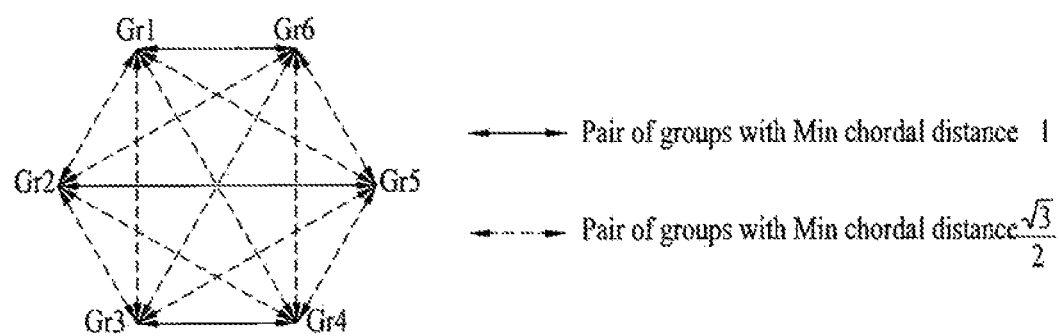
FIG. 9 illustrates the relationship of chordal distances among 6 precoding matrix groups according to one embodiment of the present invention.

FIG. 9 illustrates the relationship of chordal distances among 6 precoding matrix groups according to one embodiment of the present invention.

The following theorem can be derived using the relationship shown in FIG. 9.

<Theorem 1>

If a pair of groups shown in Table 2 satisfies $(i,j)=(1,6), (6,1), (2,5), (5,2), (3,4)$ or $(4,3)$, a chordal distance of 1 is provided. If a pair of groups shown in Table 2 satisfies $(i,j) \neq (1,6), (6,1), (2,5), (5,2), (3,4)$ or $(4,3)$, a chordal distance of $$\frac{\sqrt{3}}{2}$$

is provided.

On the other hand, the relationship of chordal distances among precoding matrices of the precoding matrix group shown in Table 2 will hereinafter be described in detail. First, a chordal distance among different precoding matrices contained in same precoding matrix group, i.e. group 1 (Gr 1) can be calculated as shown in the following Equation 15.

[Equation 15]

$$d_c(X_1, Y_1) = \frac{1}{\sqrt{2}} \|X_1 X_1^H - Y_1 Y_1^H\|_F =$$

$$\frac{1}{\sqrt{2}} \sqrt{\text{trace}((X_1 X_1^H - Y_1 Y_1^H)(X_1 X_1^H - Y_1 Y_1^H)^H)} =$$

$$\frac{1}{\sqrt{2}} \cdot \sqrt{\frac{1}{4} \cdot [2|x_1 - y_1|^2 + (|x_1|^2 - |y_1|^2)]} =$$

$$\frac{1}{\sqrt{2}} \cdot \sqrt{\frac{1}{4} \cdot (2|x_1 - y_1|^2)} = \frac{1}{2} \cdot \sqrt{|x_1 - y_1|^2}$$

where $$X_1 = \frac{1}{\sqrt{2}} \begin{bmatrix} 1 & 0 & 0 \\ x_1 & 0 & 0 \\ 0 & \sqrt{2} & 0 \\ 0 & 0 & \sqrt{2} \end{bmatrix} \in Gr1,$$

$$Y_1 = \begin{bmatrix} 1 & 0 & 0 \\ y_1 & 0 & 0 \\ 0 & \sqrt{2} & 0 \\ 0 & 0 & \sqrt{2} \end{bmatrix} \in Gr1,$$

$$X_1 X_1^H - Y_1 Y_1^H = \frac{1}{2} \begin{bmatrix} 0 & x_1^* - y_1^* & 0 & 0 \\ x_1 - y_1 & |x_1|^2 - |y_1|^2 & 0 & 0 \\ 0 & 0 & 0 & 0 \\ 0 & 0 & 0 & 0 \end{bmatrix}$$

Figure 10:
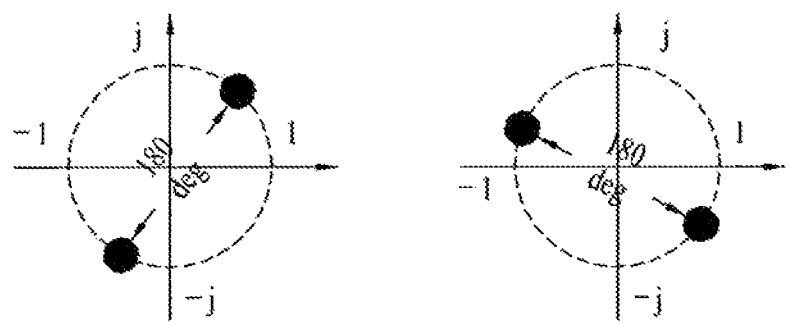
FIG. 10 illustrates conditions of variables for providing a maximum chordal distance within the same precoding matrix group.

$x_1, x_1 \in \{e^{j\frac{2\pi}{N} \times 0}, e^{j\frac{2\pi}{N} \times 1}, \ldots, e^{j\frac{2\pi}{N} \times (N-1)}\}$, $N = 2^1, 2^2, 2^3, 2^4, \ldots$ As can be seen from Equation 15, a chordal distance among different precoding matrices contained in the Group 1 (Gr 1)

is proportional to the distance among variables of individual precoding matrices. Therefore, as can be seen from Equation 16; a maximum chordal distance within the same group may be '1' as represented by the following equation 16.

$$d_c(X_1, Y_1) = \frac{1}{\sqrt{2}} \|X_1 X_1^H - Y_1 Y_1^H\|_F = \frac{1}{2} \cdot \sqrt{|x_1 - y_1|^2} \quad \text{[Equation 16]}$$

$$= \frac{1}{2} \sqrt{|e^{j\theta_{x_1}} - e^{j\theta_{y_1}}|^2}$$

$$= \frac{1}{\sqrt{2}} \sqrt{|e^{j\theta_{x_1}}|^2 |1 - e^{j\theta_1}|^2}$$

$$= \frac{1}{2} \sqrt{|1 - e^{j\theta_1}|^2}$$

$$\leq \frac{1}{2} \boxed{\sqrt{4} = 1}$$

where $x_1 = e^{j\theta_{x_1}}$, $y_1 = e^{j\theta_{y_1}}$, $\theta_1 = \theta_{x_1} - \theta_{y_1}$ In order to implement the maximum chordal distance, it is necessary for variables contained in each precoding matrix to satisfy the relationship shown in FIG. 10.

FIG. 10 illustrates conditions of variables for providing a maximum chordal distance within the same precoding matrix group.

In other words, a precoding matrix including two variables having a phase difference of 180° therebetween may have a chordal distance of 1. The above-mentioned principle may also be equally applied to the remaining groups other than the group 1 (Gr 1), and the following theorem 2 may be derived.

<Theorem 2>

In Table 2, as to a chordal distance between two precoding matrices contained in the same precoding matrix group, if variables of the precoding matrices have a phase difference of 180° therebetween, i.e., if variables of the precoding matrices are located at a diameter of a unit circle, the chordal distance of 1 can be obtained.

<Proof of Theorem 2>

As can be seen from Equation 16, it can be recognized that theorem 2 is achieved in the first group 1 (Gr 1), and the same conclusion may also be derived from other groups. As an application of theorem 2, a codebook subset for satisfying theorem 2 in the precoding matrix group 1 can be designed as represented by the following Table 3.

TABLE 3

| Codebook Subset |
|---|
| $\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}$ |

In Table 3, a basic precoding matrix is denoted by $$\begin{bmatrix} 1 & 0 & 0 \\ 1 & 0 & 0 \\ 0 & 1 & 0 \\ 0 & 0 & 1 \end{bmatrix},$$

and a codebook subset for satisfying the relationship between the basic precoding matrix and theorem 2 is illustrated. However, it should be noted that a variety of subsets may be designed according to methods for selecting such a basic precoding matrix using the same principles as described above. In this case, a codebook for implementing the maximum chordal distance may include an excessively small number of precoding matrices as necessary. Therefore, the following description assumes that variables contained in each precoding matrix group are denoted by QPSK alphabets, such that the chordal distance relationship can be represented by the following equation 17.

$$d_c(X_1, Y_1) = \frac{1}{\sqrt{2}} \|X_1 X_1^H - Y_1 Y_1^H\|_F = \frac{1}{2} \cdot \sqrt{|x_1 - y_1|^2} \quad \text{[Equation 17]}$$

$$= \frac{1}{2} \sqrt{|1 - e^{j\theta_1}|^2}$$

$$= \begin{cases} 1 & \dots \theta_1 = \pi \\ \frac{1}{\sqrt{2}} & \dots \theta_1 = \pm \frac{\pi}{2} \end{cases}$$

Figure 11:
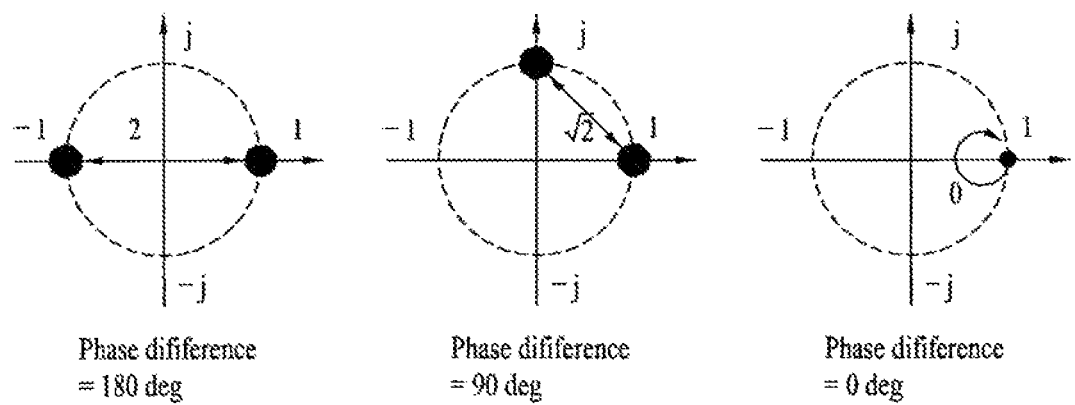
FIG. 11 illustrates the relationship of chordal distances when a variable of a precoding matrix contained in the same precoding matrix group includes a Quadrature Phase Shift Keying (QPSK) alphabet.

FIG. 11 illustrates the relationship of chordal distances when a variable of a precoding matrix contained in the same precoding matrix group includes a QPSK alphabet.

The following theorem 3 can be derived from Equation 17 and FIG. 11.

<Theorem 3>

A chordal distance between two precoding matrices, each of which has a pair of variables (i.e., (1, −1), (−1, 1), (j, −j) or (−j, j)) within the same precoding matrix group, is denoted by 1, a chordal distance between two precoding matrices, each of which has a pair of variables (i.e., (1, ±j), (−1, ±j) (j, ±1) or (−j, ±1)) within the same precoding matrix group, is denoted by $$\frac{1}{\sqrt{2}}.$$

<Proof of Theorem 3>

Theorem 3 may be demonstrated through Equation 17.

As can be seen from theorems 1 to 3, an available chordal distance between precoding matrices shown in Table 2 may be any of 1, $$\frac{\sqrt{3}}{2}$$

and $$\frac{1}{\sqrt{2}}.$$

The 4Tx rank 3 codebook according to one embodiment of the present invention will hereinafter be described in detail.

<Case of Maximized Chordal Distance>

In accordance with this embodiment of the present invention, considering that a maximum chordal distance between two precoding matrices is set to 1 on the basis of the above-mentioned theorems 1 to 3, a method for designing a codebook having only precoding matrices having a chordal distance of 1 therebetween will hereinafter be described in detail.

Based on theorem 1, two precoding matrix groups satisfying a chordal distance of 1 can be selected from among 6 precoding matrix groups. As one embodiment of the present invention, the first group 1 (Gr 1) and the sixth group 6 (Gr 6) shown in Table 1 or 2 can be selected. In addition, the precoding matrices, which have a chordal distance of 1 within the same group according to theorem 2 or 3, correspond to only two precoding matrices, variables of which have a phase difference of 180° therebetween. Accordingly, it is assumed that two precoding matrices, variables of which have the relationship denoted by (1, −1), are selected from each group. As a result, the generated codebook is represented by the following table 4.

TABLE 4

Codebook subset $$\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}, \begin{bmatrix} 0 & 1 & 0 \\ 0 & 0 & 1 \\ 1 & 0 & 0 \\ 1 & 0 & 0 \end{bmatrix}, \begin{bmatrix} 0 & 1 & 0 \\ 0 & 0 & 1 \\ 1 & 0 & 0 \\ -1 & 0 & 0 \end{bmatrix}$$

<Corollary 1>

A codebook, selected from table 2, that satisfies a chordal distance of 1 between two precoding matrices includes 4 precoding matrices.

<Case in which Both Chordal Distance and the Number of Precoding Matrices are Considered>

As can be seen from Corollary 1, in the case where the codebook is comprised of only precoding matrices having a maximum chordal distance of 1 in consideration of only the chordal distance, only four precoding matrices can be obtained, and thus it is difficult to reflect a variety of channel statuses using only the four precoding matrices. Therefore, a specific case in which a second highest chordal distance value of $$\frac{\sqrt{3}}{2}$$

is implemented is also reflected in one embodiment of the present invention in such a manner that the resultant codebook can be designed according to the reflected result. For example, in accordance with this embodiment of the present invention, two precoding matrices (e.g., precoding matrices having 1 and −1 as variables), each of which has a maximum chordal distance in each group, are selected from each of 6 groups shown in Table 1 using theorems 2 and 3, such that the 4Tx-rank 3 codebook can be given as shown in the following Table 5.

TABLE 5

Codebook subset $$\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}, \begin{bmatrix} 1 & 0 & 0 \\ 0 & 1 & 0 \\ 1 & 0 & 0 \\ 0 & 0 & 1 \end{bmatrix}, \begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ 0 & 0 & 1 \\ 1 & 0 & 0 \end{bmatrix}, \begin{bmatrix} 1 & 0 & 0 \\ 0 & 1 & 0 \\ 0 & 0 & 1 \\ -1 & 0 & 0 \end{bmatrix}$$

TABLE 5-continued

Codebook subset $$\begin{bmatrix} 0 & 1 & 0 \\ 1 & 0 & 0 \\ 1 & 0 & 0 \\ 0 & 0 & 1 \end{bmatrix}, \begin{bmatrix} 0 & 1 & 0 \\ 1 & 0 & 0 \\ -1 & 0 & 0 \\ 0 & 0 & 1 \end{bmatrix}, \begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix}, \begin{bmatrix} 0 & 1 & 0 \\ 0 & 0 & 1 \\ 1 & 0 & 0 \\ 1 & 0 & 0 \end{bmatrix}, \begin{bmatrix} 0 & 1 & 0 \\ 0 & 0 & 1 \\ 1 & 0 & 0 \\ -1 & 0 & 0 \end{bmatrix}$$

Table 5 illustrates a codebook subset. In more detail, Table 5 illustrates concepts of subsets related to rank 3 among codebooks of all ranks in the 4-antenna system including 4 antennas. From the viewpoint of rank 3, a codebook including 12 precoding matrices can be achieved.

In accordance with one embodiment of the present invention, a User Equipment (UE) selects a specific precoding matrix (in which a predetermined constant for power control is multiplied by the specific precoding matrix) from among precoding matrices of the rank 3 codebook shown in Table 5, such that the UE can perform precoding and transmit signals using the selected precoding matrix.

On the other hand, a user equipment (UE) for transmitting uplink signals using the above-mentioned codebook and a Node B for receiving the uplink signals from the UE will hereinafter be described in detail.

Figure 12:
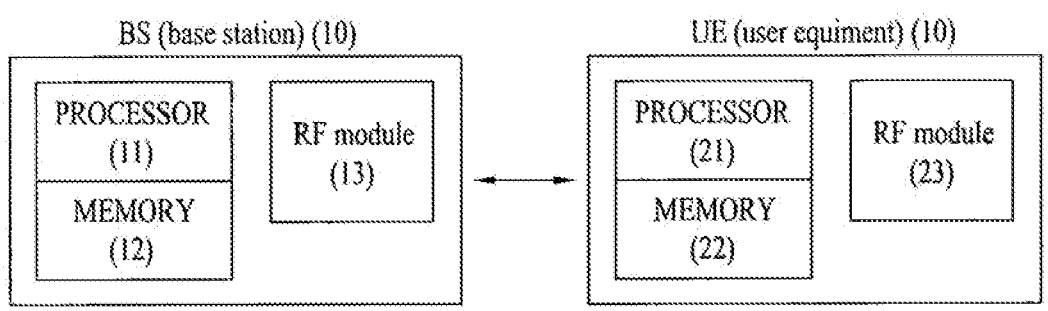
FIG. 12 is a block diagram illustrating a general Node B and a general user equipment (UE).

FIG. 12 is a block diagram illustrating a general Node B and a general user equipment (UE).

Referring to FIG. 12, a Node B 10 includes a processor 11, a memory 12, and a Radio Frequency (RF) unit 13. The RF unit 13 is used as a transmission/reception module for receiving an uplink signal and transmitting a downlink signal. The processor 11 may control downlink signal transmission using downlink signal transmission information (for example, a specific precoding matrix contained in a codebook for downlink signal transmission) stored in the memory 12. Otherwise, as an inverse process of the precoding process, the processor 11 may control a signal reception process by multiplying uplink signal reception information (e.g., an uplink signal) stored in the memory 12 by a Hermitian matrix of the same precoding matrix as a precoding matrix used in the UE 20.

The UE 20 may include a processor 21, a memory 22, and an RF unit 23 used as a transmission/reception module for transmitting an uplink signal and receiving a downlink signal.

The processor 21 may control uplink signal transmission using uplink signal transmission information (for example, a specific precoding matrix contained in the above-mentioned codebook for uplink signal transmission) stored in the memory 22. Otherwise, as an inverse process of the precoding process, the processor 21 may control a signal reception process by multiplying downlink signal reception information (e.g., a downlink signal) stored in the memory 22 by a Hermitian matrix of the same precoding matrix as a precoding matrix used in the UE 20.

In the meantime, a detailed description about a processor of the UE 20 (or the BS 10), particularly, a structure for transmitting a signal using the SC-FDMA scheme, will hereinafter be described. A processor for transmitting a signal based on the SC-FDMA scheme in the 3GPP LTE system and a processor for transmitting a signal based on an OFDM scheme in the 3GPP LTE system will hereinafter be described, and a processor for enabling a UE to transmit an uplink signal using the SC-FDMA scheme as well as the MIMO scheme will then be described below.

Figure 13:
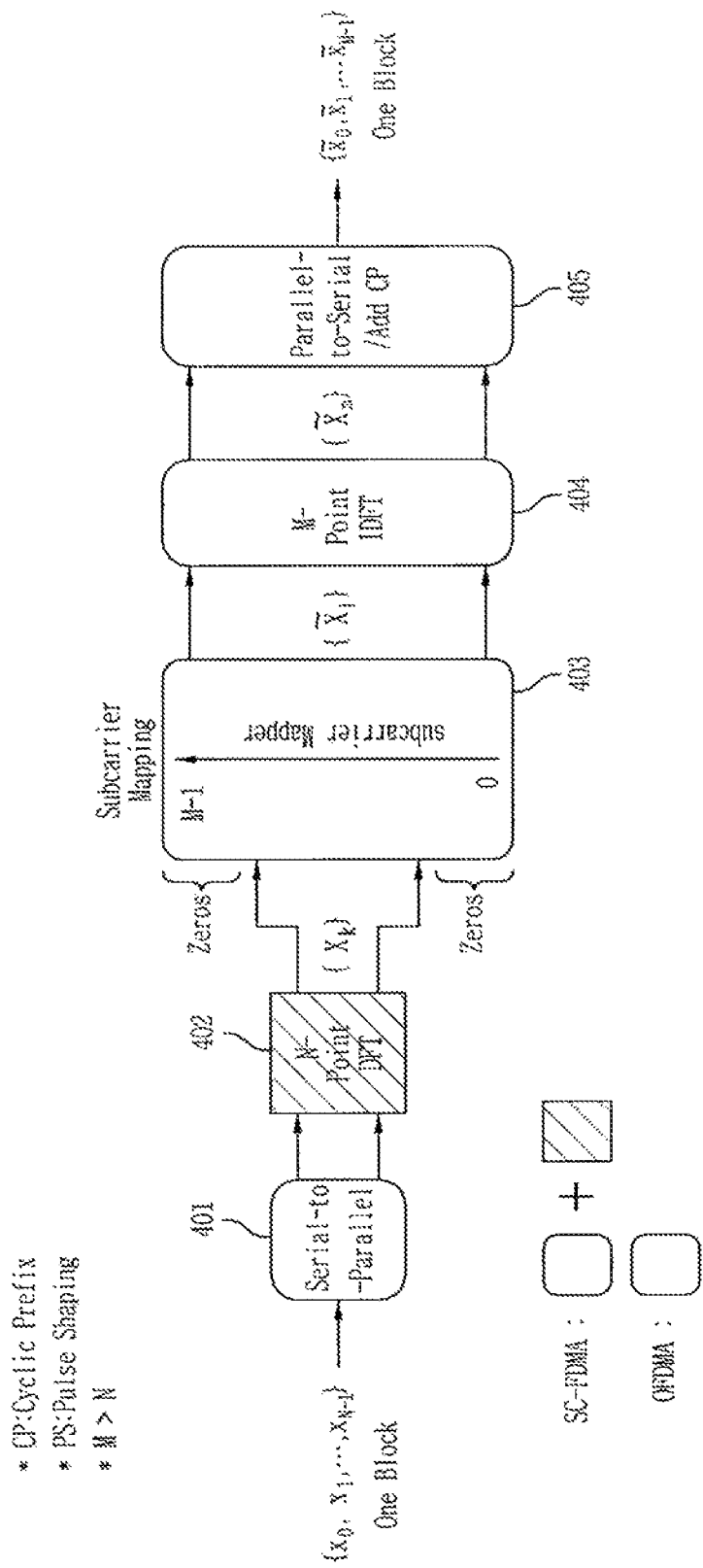
FIGS. 13 to 15 illustrate an SC-FDMA scheme for transmitting an uplink signal in a 3GPP LTE system and an OFDMA scheme for transmitting a downlink signal in the 3GPP LTE system.
Figure 14:
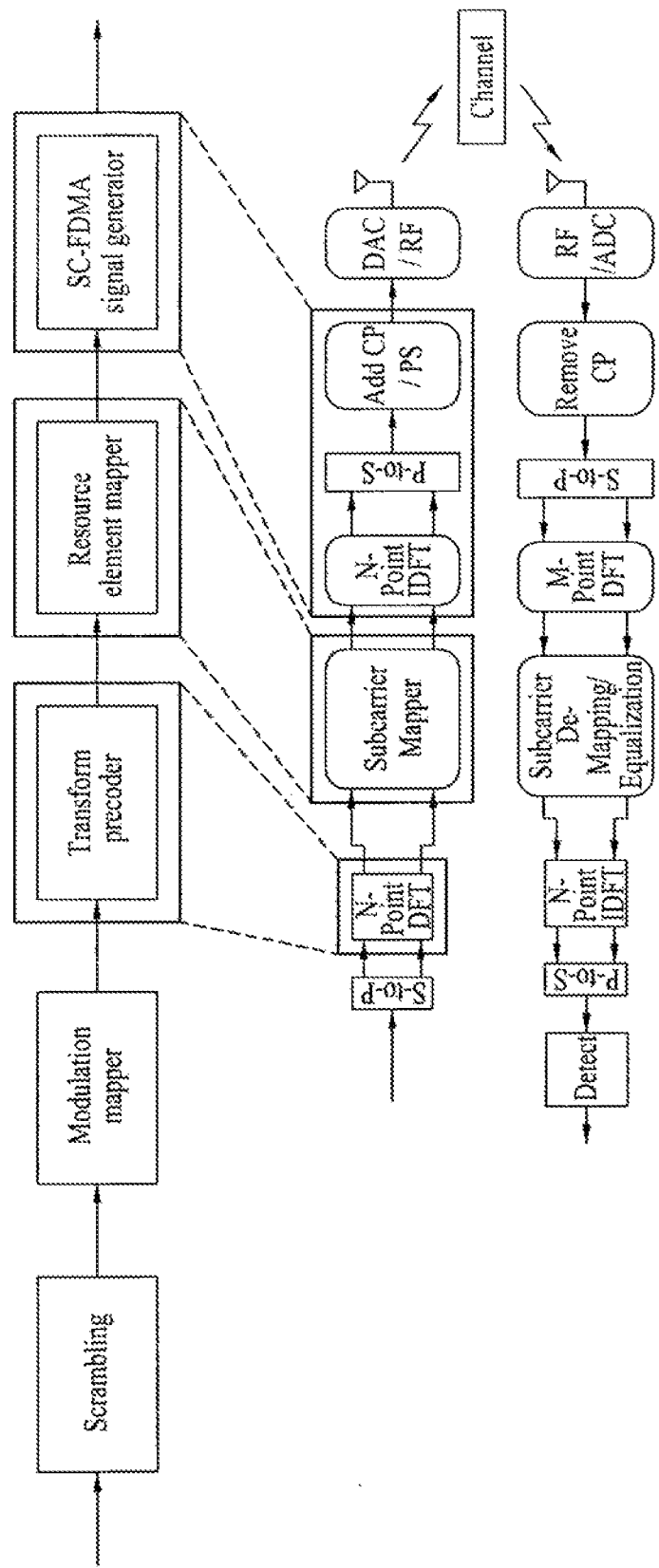
Figure 15:
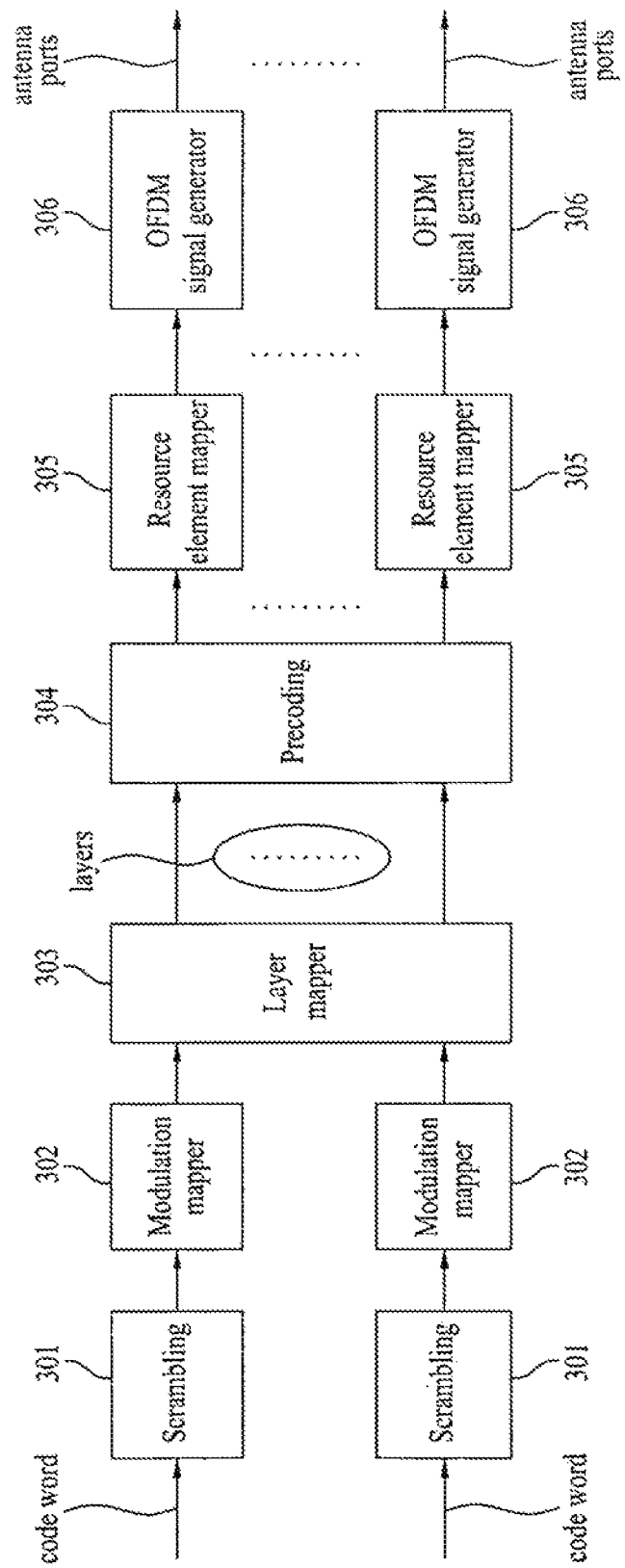

FIGS. 13 to 15 illustrate an SC-FDMA scheme for transmitting an uplink signal in the 3GPP LTE system and an OFDMA scheme for transmitting a downlink signal in the 3GPP LTE system. Referring to FIG. 13, not only a UE for transmitting an uplink signal but also a Node B for transmitting a downlink signal includes a Serial-to-Parallel converter 401, a subcarrier mapper 403, an M-point IDFT module 404, a Parallel-to-Serial converter 405, and the like. However, a UE for transmitting a signal using the SC-FDMA scheme further includes an N-point DFT module 402, and compensates for a predetermined part of the IDFT processing influence of the M-point IDFT module 404 so that a transmission signal can have single carrier characteristics.

FIG. 14 shows the relationship between a block diagram for an uplink signal process prescribed in TS 36.211 including the 3GPP LTE system specification and a processor for transmitting a signal using the SC-FDMA scheme. In accordance with TS 36.211, each UE scrambles a transmission signal using a specific scrambling sequence so as to transmit an uplink signal, and the scrambled signal is modulated so that complex symbols are generated. After that, transform precoding for performing a DFT spreading process on complex symbols is carried out. That is, a transform precoder prescribed in TS 36.211 may correspond to an N-point DFT module. Thereafter, the DFT-spread signal may be mapped to a specific resource element according to a resource block (RB)—based mapping rule by a resource element mapper, and it can be recognized that this operation corresponds to the subcarrier mapper shown in FIG. 13. The signal mapped to the resource element is M-point IDFT or IFFT-processed by the SC-FDMA signal generator, parallel-to-serial conversion is performed on the IDFT or IFFT processed result, and then a cyclic prefix (CP) is added to the P/S conversion result. In the meantime, FIG. 14 further shows a processor of a Node B that is used to receive a signal which has been received in the base station through the above-mentioned processes.

In this way, the processor for SC-FDMA transmission in the 3GPP LTE system does not include a structure for utilizing the MIMO scheme. Therefore, the BS processor for MIMO transmission in the 3GPP LTE system will be described first, and a processor for transmitting an uplink signal by combining the SC-FDMA scheme with the MIMO scheme using the above BS processor will then be described.

FIG. 15 is a block diagram illustrating a processor for enabling the Node B to transmit a downlink signal using the MIMO scheme in the 3GPP LTE system.

A Node B in the 3GPP LTE system can transmit one or more codewords via a downlink. Therefore, one or more codewords may be processed as complex symbols by the scrambling module 301 and the modulation mapper 302 in the same manner as in the uplink operation shown in FIG. 12. Thereafter, the complex symbols are mapped to a plurality of layers by the layer mapper 303, and each layer is multiplied by a predetermined precoding matrix selected according to the channel status and is then allocated to each transmission antenna by the precoding module 304. The processed transmission signals of individual antennas are mapped to time-frequency resource elements to be used for data transmission by the resource element mapper 305. Thereafter, the mapped result may be transmitted via each antenna after passing through the OFDM signal generator 306.

However, if a downlink signal scheme shown in FIG. 15 is used in the 3GPP LTE system, PAPR or CM properties may be degraded. Thus, it is necessary for a UE to effectively combine the SC-FDMA scheme for maintaining good PAPR and CM properties described in FIGS. 13 and 14 with the MIMO scheme shown in FIG. 15, and a UE for performing precoding using the precoding matrix capable of maintaining good PAPR and CM properties described in the above embodiment must be constructed.

In accordance with one embodiment of the present invention, it is assumed that a UE for transmitting an uplink signal via multiple antennas (multi-antenna) includes multiple antennas (not shown) for transmitting and receiving signals. Referring to FIG. 12, the UE 20 includes a memory 22 for storing a codebook, and a processor 21 that are connected to multiple antennas (not shown) and the memory 22 so as to process uplink signal transmission. In this case, the codebook stored in the memory 22 includes precoding matrices shown in Table 5. The processor 21 of the UE configured as described above will hereinafter be described in detail.

Figure 16:
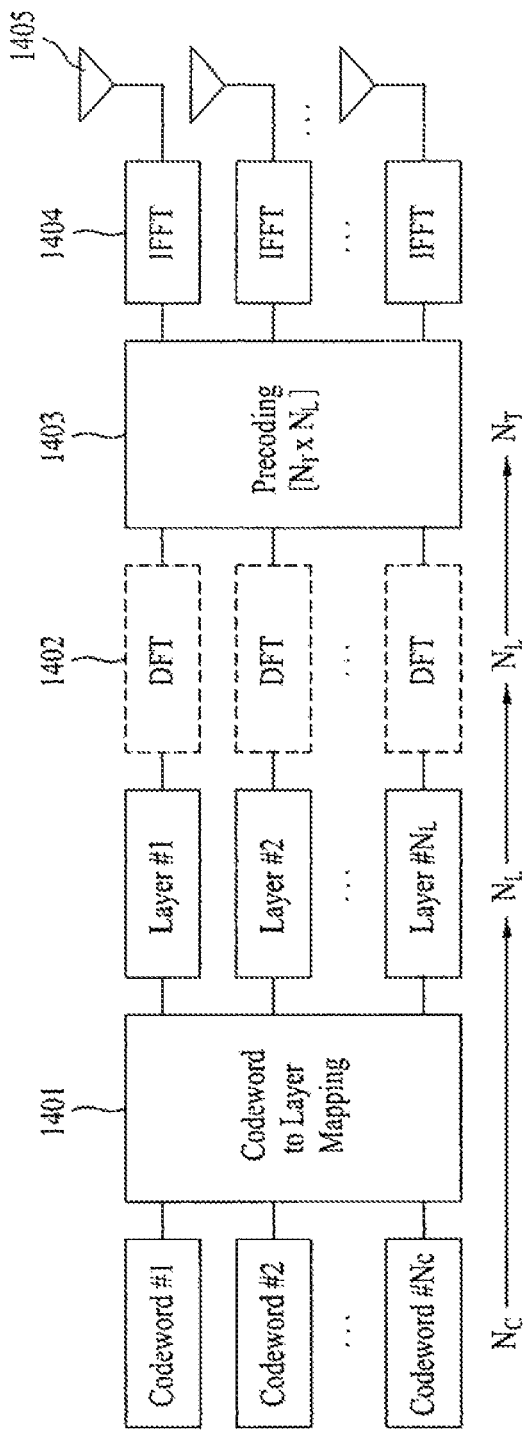
FIG. 16 illustrates a processor of a UE according to one embodiment of the present invention.

FIG. 16 illustrates a processor of the UE according to one embodiment of the present invention.

Referring to FIG. 16, the processor of the UE 20 according to one embodiment of the present invention includes a codeword to layer mapper 1401 for mapping uplink signals to a predetermined number of layers corresponding to a specific rank, a predetermined number of DFT modules 1402 for performing Discrete Fourier Transform (DFT) spreading on each of the predetermined number of layer signals, and a precoder 1403. The precoder 1403 selects a specific precoding matrix from a codebook comprised of 12 precoding matrices obtained when two precoding matrices including variables that have a phase difference of 180° therebetween are selected from each of 6 precoding matrix groups shown in Table 5, thereby precoding a DFT-spread resultant layer signal received from the DFT module 1402. Particularly, in this embodiment of the present invention, each DFT module 1402 performs spreading of each layer signal, this DFT module 1402 for spreading each layer signal is located just before the precoder 1403. When the precoder 1403 performs precoding, the precoder 1403 is configured such that each layer signal is mapped to one antenna and then transmitted via the mapped antenna, so that single carrier characteristics of each layer signal are maintained and good PAPR and CM properties are also maintained. In the meantime, the UE 20 further includes a transmission module. The transmission module performs a process constructing an SC-FDMA symbol upon the precoded signal, and transmits the resultant precoded signal to the Node B via multiple antennas 1405.

In the meantime, the precoder 1403 selects a precoding matrix to be used for signal transmission from the codebook stored in the memory 22, and performs precoding on the selected precoding matrix. Preferably, these precoding matrices may be precoding matrices established for equalizing transmission powers of multiple antennas and/or transmission powers of respective layers.

It is assumed that the number of multiple antennas 1405 is 4. The processor of the UE according to one embodiment of the present invention may further perform not only a layer shift function for periodically or aperiodically changing a layer mapped to a specific codeword but also an antenna shift function for periodically or aperiodically changing an antenna via which a specific layer signal is transmitted. The layer shift function may be performed by the layer mapper 1401 separately from the precoding of the precoder 1403, or may also be performed through column permutation of the precoding matrix when the precoder 1403 performs precoding. In addition, the antenna shift function may also be carried out separately from the precoding of the precoder 1403, or may also be performed through row permutation of the precoding matrix.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention. It is apparent that the present invention may be embodied by a combination of claims which do not have an explicit cited relation in the appended claims or may include new claims by amendment after application.

As apparent from the above description, a method for transmitting and receiving uplink signals according to the embodiments of the present invention may transmit and receive using the above-mentioned optimized 4Tx Rank 3 codebook, transmit uplink signals by reflecting a channel situation using a small amount of signaling overhead in various ways, and solve a PAPR problem.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting uplink signal via multiple antennas by a user equipment (UE), the method comprising:
   mapping the uplink signals to a plurality of layers, wherein the number of the plurality of layers is less or equal than the number of the multiple antennas;
   performing Discrete Fourier Transform (DFT) spreading upon each of uplink signals of the plurality of layers;
   precoding the DFT-spread uplink signals of the plurality of layers using a specific precoding matrix selected from a codebook;
   generating a Single Carrier-Frequency Division Multiple Access (SC-FDMA) symbol based on the precoded signals; and
   transmitting the SC-FDMA symbol to a base station (BS) via the multiple antennas,
   wherein when the number of the plurality of layers is three and the number of the multiple antennas is four, the codebook consists of precoding matrix groups of $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix},$$

$$\begin{bmatrix} 0 & 1 & 0 \\ 1 & 0 & 0 \\ 0 & 0 & 1 \\ X & 0 & 0 \end{bmatrix}, \text{ and } \begin{bmatrix} 0 & 1 & 0 \\ 0 & 0 & 1 \\ 1 & 0 & 0 \\ X & 0 & 0 \end{bmatrix}.$$

2. The method according to claim 1, wherein the codebook is set to equalize transmission power of multiple antennas.

3. The method according to claim 1, wherein each of the precoding matrix groups is satisfied with a condition of $X \in \{1, -1\}$.

4. The method according to claim 1, wherein the codebook consists of precoding matrices of $$\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}, \begin{bmatrix} 1 & 0 & 0 \\ 0 & 1 & 0 \\ 1 & 0 & 0 \\ 0 & 0 & 1 \end{bmatrix},$$

$$\begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ 0 & 0 & 1 \\ 1 & 0 & 0 \end{bmatrix}, \begin{bmatrix} 1 & 0 & 0 \\ 0 & 1 & 0 \\ 0 & 0 & 1 \\ -1 & 0 & 0 \end{bmatrix}, \begin{bmatrix} 0 & 1 & 0 \\ 1 & 0 & 0 \\ 1 & 0 & 0 \\ 0 & 0 & 1 \end{bmatrix}, \begin{bmatrix} 0 & 1 & 0 \\ 1 & 0 & 0 \\ -1 & 0 & 0 \\ 0 & 0 & 1 \end{bmatrix},$$

$$\begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix}, \begin{bmatrix} 0 & 1 & 0 \\ 0 & 0 & 1 \\ 1 & 0 & 0 \\ 1 & 0 & 0 \end{bmatrix}, \begin{bmatrix} 0 & 1 & 0 \\ 0 & 0 & 1 \\ 1 & 0 & 0 \\ -1 & 0 & 0 \end{bmatrix},$$

to each of which a predetermined constant is multiplied.

5. A user equipment (UE) for transmitting uplink signals via multiple antennas comprising:
   a radio frequency unit; and
   a processor,
   wherein the processor is configured
   to map the uplink signals to a plurality of layers, wherein the number of the plurality of layers is less or equal than the number of multiple antenna,
   to perform Discrete Fourier Transform (DFT) spreading upon each of uplink signals of the plurality of layers;
   to precode the DFT-spread uplink signals of the plurality of layers using a specific precoding matrix selected from a codebook;
   to generate a Single Carrier-Frequency Division Multiple Access (SC-FDMA) symbol based on the precoded signals; and to transmit the SC-FDMA symbol to a base station (BS) via the multiple antennas, wherein when the number of the plurality of layers is three and the number of the multiple antennas is four, the codebook consists of precoding matrix groups of $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

and $$\begin{bmatrix} 0 & 1 & 0 \\ 0 & 0 & 1 \\ 1 & 0 & 0 \\ X & 0 & 0 \end{bmatrix}.$$

6. The user equipment (UE) according to claim 5, wherein the codebook is set to equalize transmission power of multiple antennas.

7. The user equipment (UE) according to claim 5, wherein each of the precoding matrix groups is satisfied with a condition of $X\delta\{1, -1\}$.

8. The user equipment (UE) according to claim 5, wherein the memory stores, as the codebook, precoding matrices of $$\begin{bmatrix} 1 & 0 & 0 \\ 1 & 0 & 0 \\ 0 & 1 & 0 \\ 0 & 0 & 1 \end{bmatrix}, \begin{bmatrix} 1 & 0 & 0 \\ -1 & 0 & 0 \\ 0 & 1 & 0 \\ 0 & 0 & 1 \end{bmatrix}, \begin{bmatrix} 1 & 0 & 0 \\ 0 & 1 & 0 \\ 1 & 0 & 0 \\ 0 & 0 & 1 \end{bmatrix},$$

$$\begin{bmatrix} 1 & 0 & 0 \\ 0 & 1 & 0 \\ -1 & 0 & 0 \\ 0 & 0 & 1 \end{bmatrix}, \begin{bmatrix} 1 & 0 & 0 \\ 0 & 1 & 0 \\ 0 & 0 & 1 \\ 1 & 0 & 0 \end{bmatrix}, \begin{bmatrix} 1 & 0 & 0 \\ 0 & 1 & 0 \\ 0 & 0 & 1 \\ -1 & 0 & 0 \end{bmatrix}, \begin{bmatrix} 0 & 1 & 0 \\ 1 & 0 & 0 \\ 1 & 0 & 0 \\ 0 & 0 & 1 \end{bmatrix}, \begin{bmatrix} 0 & 1 & 0 \\ 1 & 0 & 0 \\ -1 & 0 & 0 \\ 0 & 0 & 1 \end{bmatrix},$$

$$\begin{bmatrix} 0 & 1 & 0 \\ 1 & 0 & 0 \\ 0 & 0 & 1 \\ 1 & 0 & 0 \end{bmatrix}, \begin{bmatrix} 0 & 1 & 0 \\ 1 & 0 & 0 \\ 0 & 0 & 1 \\ -1 & 0 & 0 \end{bmatrix}, \begin{bmatrix} 0 & 1 & 0 \\ 0 & 0 & 1 \\ 1 & 0 & 0 \\ 1 & 0 & 0 \end{bmatrix}, \begin{bmatrix} 0 & 1 & 0 \\ 0 & 0 & 1 \\ 1 & 0 & 0 \\ -1 & 0 & 0 \end{bmatrix}$$

to each of which a predetermined constant is multiplied.

* * * * *